United States Patent
Chow et al.

(10) Patent No.: US 7,676,640 B2
(45) Date of Patent: Mar. 9, 2010

(54) FLASH MEMORY CONTROLLER CONTROLLING VARIOUS FLASH MEMORY CELLS

(75) Inventors: David Q. Chow, San Jose, CA (US);
Charles C. Lee, Cupertino, CA (US);
Frank I-Kang Yu, Palo Alto, CA (US);
Edward W. Lee, Mountain View, CA (US); Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 138 days.

(21) Appl. No.: 11/864,652

(22) Filed: Sep. 28, 2007

(65) Prior Publication Data
US 2008/0086631 A1    Apr. 10, 2008

Related U.S. Application Data

(63) Continuation-in-part of application No. 11/611,811, filed on Dec. 15, 2006, which is a continuation-in-part of application No. 09/478,720, filed on Jan. 6, 2000, now Pat. No. 7,257,714, and a continuation-in-part of application No. 10/957,089, filed on Oct. 1, 2004.

(51) Int. Cl.
*G06F 13/10*    (2006.01)
(52) U.S. Cl. .................. 711/162; 711/157; 711/166; 711/168
(58) Field of Classification Search ............... 711/103, 711/162
See application file for complete search history.

(56) References Cited

U.S. PATENT DOCUMENTS

| | | | |
|---|---|---|---|
| 5,623,552 A | 4/1997 | Lane | |
| 5,907,856 A | 5/1999 | Estakhri et al. | |
| 5,959,541 A | 9/1999 | DiMaria et al. | |
| 6,000,006 A | 12/1999 | Bruce et al. | |
| 6,012,636 A | 1/2000 | Smith | |
| 6,069,920 A | 5/2000 | Schulz et al. | |
| 6,081,858 A | 6/2000 | Abudayyeh et al. | |
| 6,125,192 A | 9/2000 | Bjorn et al. | |
| 6,193,152 B1 | 2/2001 | Fernando et al. | |
| 6,202,138 B1 | 3/2001 | Estakhri et al. | |
| 6,230,233 B1 | 5/2001 | Lofgren et al. | |
| 6,275,894 B1 | 8/2001 | Kuo et al. | |
| 6,321,478 B1 | 11/2001 | Klebes | |
| 6,354,858 B1 * | 3/2002 | Cooper et al. ............... 439/327 |
| 6,547,130 B1 | 4/2003 | Shen | |
| 6,636,929 B1 | 10/2003 | Frantz et al. | |
| 6,718,407 B2 | 4/2004 | Martwick | |
| 6,880,024 B2 | 4/2005 | Chen et al. | |

(Continued)

*Primary Examiner*—Hetul Patel
(74) *Attorney, Agent, or Firm*—Blakely Sokoloff Taylor & Zafman LLP

(57) ABSTRACT

An electronic data flash card is accessible by a host system, and includes a flash memory controller and at least one flash memory device coupled to the flash controller. The boot code and control code for the flash memory system (flash card) are stored in the flash memory device during a programming procedure. The flash controller transfers the boot code and control code to a volatile main memory (e.g., random access memory or RAM) at start up or reset making a RAM-based memory system. Boot code and control code are selectively overwritten during a code updating operation. A single flash controller thus supports multiple brands and types of flash memory to eliminate stocking issues.

18 Claims, 25 Drawing Sheets

Small Block Type Flash, detect low signal here.

Large Block Type Flash, until 30h command issued, the controller detects low signal here.

U.S. PATENT DOCUMENTS

| | | |
|---|---|---|
| 7,103,765 B2 | 9/2006 | Chen |
| 7,237,103 B2 * | 6/2007 | Duncan .......................... 713/1 |
| 7,249,978 B1 | 7/2007 | Ni |
| 7,257,714 B1 | 8/2007 | Shen |
| 2001/0043174 A1 | 11/2001 | Jacobsen et al. |
| 2002/0166023 A1 | 11/2002 | Nolan et al. |
| 2003/0046510 A1 | 3/2003 | North |
| 2003/0163656 A1 | 8/2003 | Ganton |
| 2004/0139290 A1 * | 7/2004 | Wolrich et al. .............. 711/157 |
| 2004/0148482 A1 | 7/2004 | Grundy et al. |
| 2004/0255054 A1 | 12/2004 | Pua et al. |
| 2005/0060528 A1 * | 3/2005 | Kim .............................. 713/1 |
| 2005/0102444 A1 | 5/2005 | Cruz |
| 2005/0120146 A1 | 6/2005 | Chen et al. |
| 2005/0160213 A1 | 7/2005 | Chen |
| 2005/0193161 A1 | 9/2005 | Lee et al. |
| 2005/0246243 A1 | 11/2005 | Adams et al. |
| 2005/0268082 A1 | 12/2005 | Poisner |
| 2005/0283598 A1 * | 12/2005 | Gaskins et al. ................. 713/2 |
| 2006/0065743 A1 | 3/2006 | Fruhauf |
| 2006/0075174 A1 | 4/2006 | Vuong |
| 2006/0075395 A1 * | 4/2006 | Lee et al. ..................... 717/168 |
| 2006/0106962 A1 | 5/2006 | Woodbridge et al. |
| 2006/0161725 A1 | 7/2006 | Lee et al. |
| 2006/0206702 A1 | 9/2006 | Fausak |
| 2006/0242395 A1 | 10/2006 | Fausak |
| 2007/0094489 A1 | 4/2007 | Ota et al. |
| 2007/0112067 A1 | 5/2007 | Oh et al. |
| 2007/0113267 A1 | 5/2007 | Iwanski et al. |
| 2007/0130436 A1 | 6/2007 | Shen |

* cited by examiner

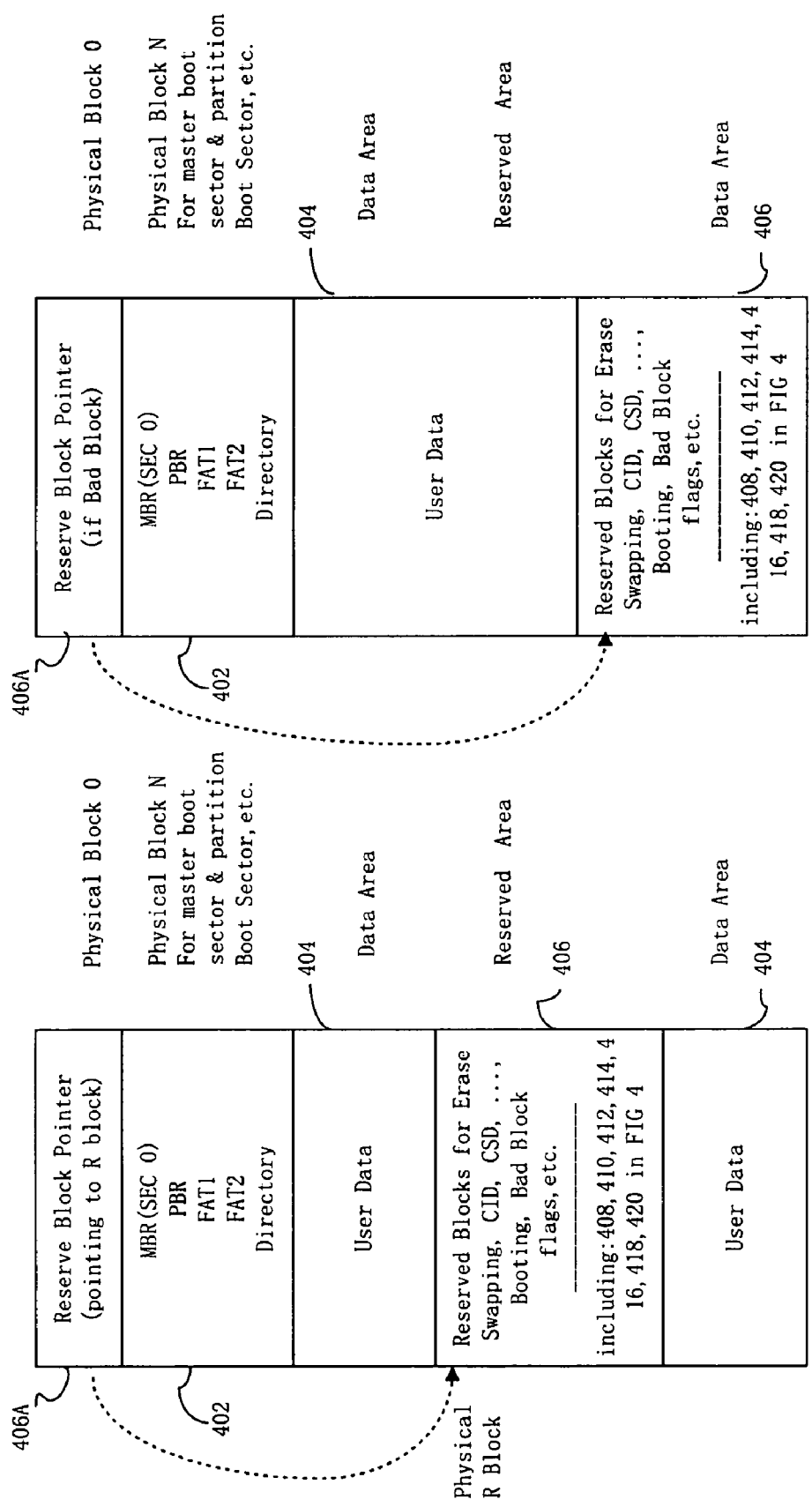

FLASH MEMORY CONTROLLER CONTROLLING VARIOUS FLASH MEMORY CELLS

RELATED APPLICATIONS

This application is a continuation-in-part of co-pending U.S. patent application for "Flash Memory Controller For Electronic Data Flash Card", U.S. application Ser. No. 11/611,811, filed Dec. 15, 2006, which is a continuation-in-part of U.S. patent application for "Electronic Data Storage Medium With Fingerprint Verification Capability", U.S. application Ser. No. 09/478,720, filed Jan. 6, 2000, now U.S. Pat. No. 7,257,714, and a continuation-in-part of U.S. patent application for "Flash Card System", U.S. application Ser. No. 10/957,089, filed Oct. 1, 2004. The disclosure of the above-identified applications is incorporated by reference herein in its entirety.

FIELD OF THE INVENTION

The invention relates to electronic data flash cards, more particularly to a system and method for controlling flash memory in an electronic data flash card.

BACKGROUND OF THE INVENTION

Confidential data files are often stored in floppy disks or are delivered via networks that require passwords or that use encryption coding for security. Confidential documents are sent by adding safety seals and impressions during delivery. However, confidential data files and documents are exposed to the danger that the passwords, encryption codes, safety seals and impressions may be broken (deciphered), thereby resulting in unauthorized access to the confidential information.

Multi-Media cards (MMC) that use flash memory are popular for storing data. Flash memory-based MMCs (or "flash cards") are well known and are used in products such as digital cameras. Benefits of flash cards include low-power dissipation and high resistance to vibration.

FIG. 21 is a block diagram of a conventional flash card 50 coupled with a user host 52. The flash card 50 includes a flash memory controller 60 and a flash memory device 62. The user host 52 can be a camera or a PC, for example. Data is transferred between the user host 52 and the flash memory device 62 via the flash memory controller 60. Information required for accessing the flash memory device 62 is stored in a ROM (not only normal read-only memory ROM block, but also state-machine or logic array which can acts as ROM function) 64 in the flash memory controller 60. Such information includes boot code 66 and control code 68. The boot code 66 is software that initializes the flash card 50 during the early phase of the booting sequence. The control code 68 contains both necessary information to exercise the initial booting sequence, and information that enables the flash memory controller 60 to access the flash memory device 62.

A problem with conventional flash memory systems is that the boot code 66 and/or the control code 68 can have bugs, which may not be discovered until the flash memory system is already in the field. Also, the boot code 66 and/or the control code 68 may have to be updated due to bugs or due to improvements to the codes.

The conventional solution is to replace the flash memory controller 60 as it contains the ROM 64, in which the boot code 66 and the control code 68 are stored. A problem with this solution is that it can cause significant inventory issues for a flash card manufacturer. For instance, an entire stock of flash memory controllers may have to be thrown out for one fix or for an update to the boot code or to the control code. Hence, a new stock of flash memory controllers would have to be ordered. This can be an on-going problem if subsequent updates are required.

Accordingly, what is needed is an improved flash memory system that is be adaptable, simple, cost effective, and capable of being easily adapted to existing technology.

SUMMARY OF THE INVENTION

Therefore, an object of the present invention is to provide an electronic data storage medium with a user verification capability for security during the transfer of information to or from a flash memory device.

According to certain embodiments of the present invention, an electronic data storage medium (flash card) is adapted to be accessed by a data terminal (e.g., a host system). The electronic data flash card includes a flash memory device, a user identification system (such as a fingerprint sensor, or a stored password that is accessed by way of a function key set or a host system), an input-output interface circuit and a processing unit (flash memory controller). The flash memory device stores a data file and security data (e.g., fingerprint reference data obtained by scanning a fingerprint of a person authorized to access the data file, or a security code such as a stored password). In one embodiment, the fingerprint sensor is adapted to scan a fingerprint of a user of the electronic data storage medium and to generate fingerprint scan data. In another embodiment, a security code is accessed by way of a function key set or through a host system. The input/output interface circuit can be activated or deactivated so as to establish communication with the host system. The processing unit is connected to the flash memory device, the verification system (e.g., the fingerprint sensor) and the input/output interface circuit. The processing unit is operable selectively in a programming mode, a reset mode, a data retrieving mode, a code updating mode, and a data resetting mode. When the processing unit is in the programming mode, the processing unit activates the input/output interface circuit to receive the data file, the boot code data, the control code data, and optional security data from the host system, and to store the data in the flash memory device. When the processing unit is in the reset mode, the processing unit reads the boot code data and the control code data from the flash memory device, and enables the input/output interface circuit to exchange data with the host system in accordance with the boot code data and the control code data. When the processing unit is in the data retrieving mode, the processing unit activates the input/output interface circuit to transmit the data file to the host system. In the code updating mode, updated boot code data and updated control code data are written into the flash memory device, thereby facilitating updating of the boot code and control code in the field (i.e., without replacing an on-chip ROM cell, as required in conventional devices). In the data resetting mode, the data file (and the security data) is/are erased from the flash memory device. Because the boot code and the control code are stored in the flash memory device (instead of in ROM as in conventional devices), the boot code and control code can be updated in the field, and a single flash memory controller can be used to control a large number of flash memory device types and sizes.

BRIEF DESCRIPTION OF THE DRAWING

Other features and advantages of the present invention will become apparent in the following detailed description of the preferred embodiment with reference to the accompanying drawings, of which:

FIGS. 4A and 4B are diagrams of a flash memory structure in accordance with certain embodiments of the present invention.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1A:
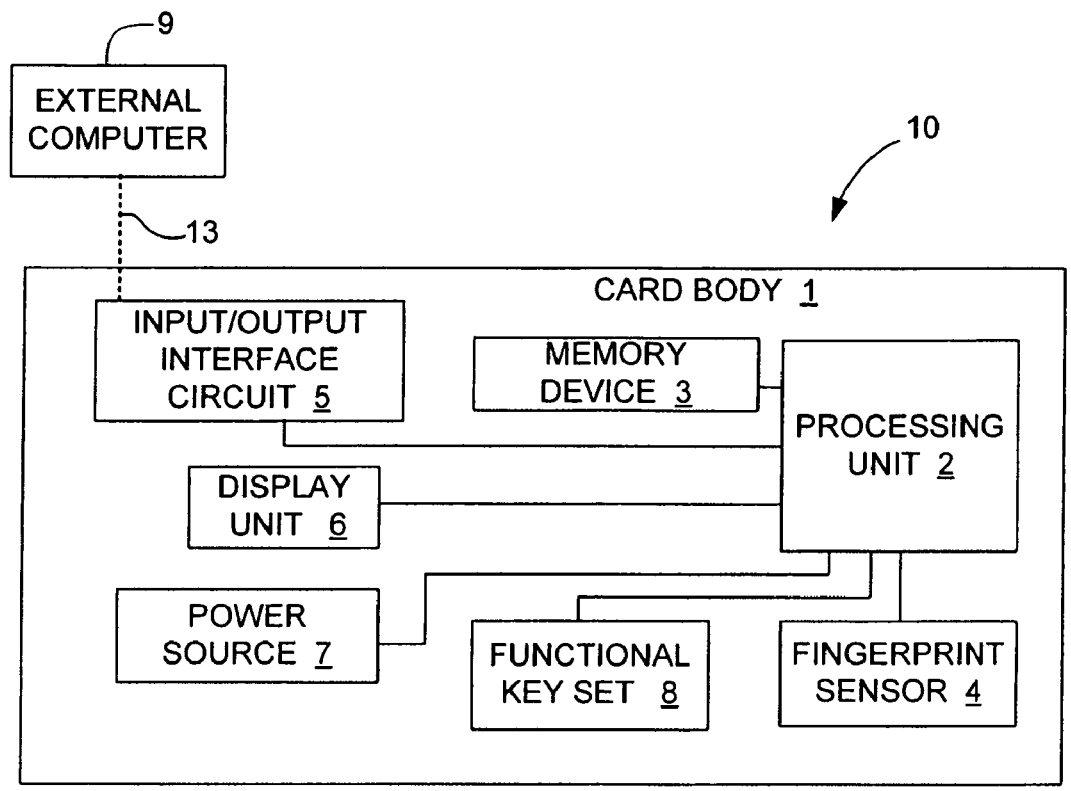
FIG. 1(A) is a block diagram showing an electronic data flash card and host system according to an embodiment of the present invention.

Referring to FIG. 1(A), according to an embodiment of the present invention, an electronic data flash card 10 is adapted to be accessed by an external (host) computer 9 either via an interface bus 13 or a card reader (not shown) or other interface mechanism (not shown), and includes a card body 1, a processing unit 2, one or more flash memory devices 3, an optional fingerprint sensor (security device) 4, an input/output interface circuit 5, an optional display unit 6, an optional power source (e.g., battery) 7, and an optional function key set 8.

Flash memory device 3 is mounted on the card body 1, and stores in a known manner therein a data file, a reference password, and fingerprint reference data obtained by scanning a fingerprint of a person authorized to access the data file. The data file can be variety of files such as a picture file or a text file. As set forth below, the flash memory device 3 also includes boot code data and control code data.

The fingerprint sensor 4 is mounted on the card body 1, and is adapted to scan a fingerprint of a user of electronic data flash card 10 to generate fingerprint scan data. One example of the fingerprint sensor 4 that can be used in the present invention is that disclosed in a co-owned U.S. Pat. No. 6,547,130, entitled "INTEGRATED CIRCUIT CARD WITH FINGERPRINT VERIFICATION CAPABILITY", the entire disclosure of which is incorporated herein by reference. The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as a column direction of the array. Each of the scan cells generates a first logic signal upon detection of a ridge in the fingerprint of the holder of card body, and a second logic signal upon detection of a valley in the fingerprint of the holder of card body.

The input/output interface circuit 5 is mounted on the card body 1, and can be activated so as to establish a communication with the host computer 9, for example, by way of an appropriate socket via an interface bus 13 or a card reader. In one embodiment, input/output interface circuit 5 includes circuits and control logic associated with one of a Universal Serial Bus (USB), PCMCIA (personal computer memory card international association), and RS232 interface structure that is connectable to an associated socket connected to or mounted on the host computer 9. In another embodiment, the input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with the host computer 9 via an interface bus 13 or a card reader.

The processing unit 2 is mounted on the card body 1, and is connected to the memory device 3, the fingerprint sensor 4 and the input/output interface circuit 5 by way of associated conductive traces or wires disposed on card body 1. In one embodiment, processing unit 2 is one of an 8051, 8052, or 80286 microprocessor which is available, for example, from Intel Corporation. In other embodiments, processing unit 2 includes a RISC, ARM, MIPS or other digital signal processor. In accordance with an aspect of the present invention, processing unit 2 is controlled by a program stored at least partially in flash memory device 3 such that processing unit 2 is operable selectively in: (1) a programming mode, where the processing unit 2 activates the input/output interface circuit 5 to receive the data file, the boot code data, the control code data, and optional fingerprint reference data from the host computer 9, and to store the data in the flash memory device 3 (as an option, in a compressed format to increase storage capacity of the memory device 3); (2) a reset mode in which the boot code data and the control code data are read from the flash memory device and utilized to configure and control the operation of the processing unit 2; (3) a data retrieving mode, where the processing unit 2 reads the fingerprint scan data from the fingerprint sensor 4, compares the fingerprint scan data with at least a segment of the fingerprint reference data in the flash memory device 3 to verify if the user of the electronic data flash card 10 is authorized to access the data file stored in the flash memory device 3, and activates the input/output interface circuit 5 to transmit the data file to the host computer 9 upon verifying that the user is authorized to access the data file stored in the flash memory device 3; (4) a code updating mode in which the boot code data and the control code data are updated in the memory device 3; and (5) a data resetting mode, where the data file and the fingerprint reference data are erased from the memory device 3. In operation, host computer 9 sends write and read requests to electronic data flash card 10 via a card reader or interface bus 13 and input/output interface circuit 5 to the processing unit 2, which in turn utilizes a flash memory controller (not shown) to read from or write to the associated one or more flash memory device 3. In one embodiment, the processing unit 2 automatically initiates the data resetting mode operation upon detecting that a preset time period has elapsed since storage of the data file and the fingerprint reference data in the memory device 3.

8051, 8052 and 80286 processors are microprocessors developed by Intel Corporation, using a complex instruction set. 8051 and 8052 processors have an 8-bit data bus, whereas 80286 processor has a 16-bit data bus. RISC, ARM and MIPS processors are microprocessors using the architecture of a reduced instruction set. 8051 and 8052 processors are widely used in a low cost application. An 80286 processor can be used for higher speed/performance applications. RISC, ARM and MIPS processors are higher cost microprocessors better suited to more complex applications such as advanced ECC (Error Correction Code) and data encryptions.

The optional power source 7 is mounted on the card body 1, and is connected to the processing unit 2 and other associated units on card body 1 for supplying needed electrical power thereto.

The optional function key set 8, which is mounted on the card body 1, is connected to the processing unit 2, and is operable so as to initiate operation of processing unit 2 in a selected one of the programming, reset, data retrieving, code updating, and data resetting modes. The function key set 8 is operable to provide an input password to the processing unit 2. The processing unit 2 compares the input password with the reference password stored in the flash memory device 3, and initiates authorized operation of electronic data flash card 10 upon verifying that the input password corresponds with the reference password.

The optional display unit 6 is mounted on the card body 1, and is connected to and controlled by the processing unit 2 for showing the data file exchanged with the host computer 9 and for displaying the operating status of the electronic data flash card 10.

The following are some of the advantages of embodiments of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in an enhanced security. Additional features and advantages of the present invention are set forth below.

Figure 1B:
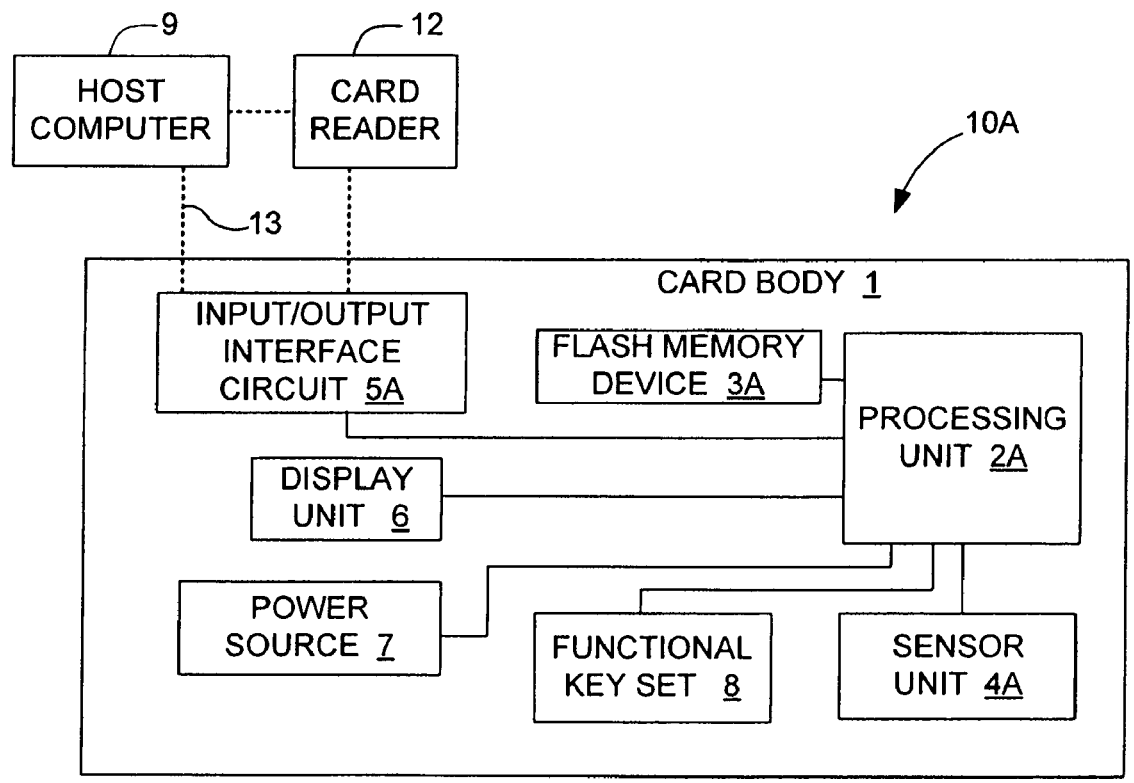
FIG. 1(B) is a block diagram showing an electronic data flash card and host system according to another embodiment of the present invention.

FIG. 1(B) is a block diagram of an electronic data flash card 10A in accordance with an alternative embodiment of the present invention in which a generalized sensor unit 4A is provided in place of the fingerprint sensor described above. Exemplary sensor units include retina (e.g., eye) scanners or voice recognition devices that are capable of detecting a physical characteristic of an authorized user, and operates in a manner similar to that described above with reference to fingerprint sensor 4.

Figure 1C:
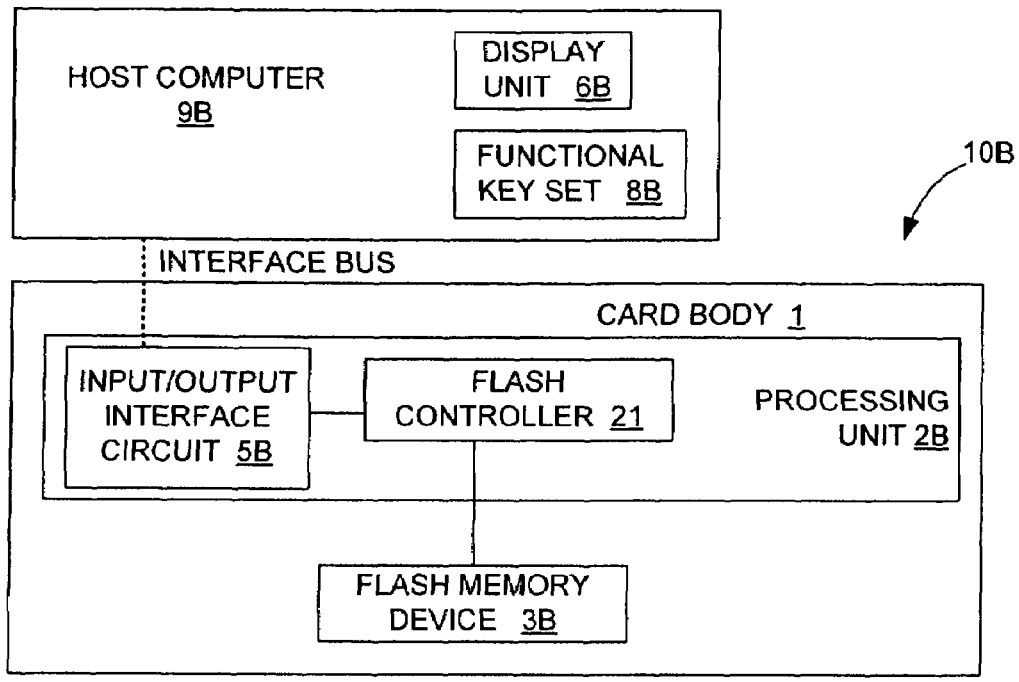
FIG. 1(C) is a block diagram showing an electronic data flash card and host system according to another embodiment of the present invention.

FIG. 1(C) is a block diagram of an electronic data flash card 10B in accordance with yet another alternative embodiment of the present invention. Electronic data flash card 10B omits the fingerprint sensor and the associated user identification process. The electronic data flash card 10B also includes a highly integrated processing unit 2B including an input/output interface circuit 5B and a flash memory controller 21 for integration cost reduction reasons. Input/output interface circuit 5B includes a transceiver block, a serial interface engine block, data buffers, registers and interrupt logic. Input/output interface circuit 5B is coupled to an internal bus to allow for the various elements of input/output interface circuit 5B to communicate with the elements of flash memory controller 21. Flash memory controller 21 includes a microprocessor unit, a ROM, a RAM, flash memory controller logic, error correction code logic, and general purpose input/output (GPIO) logic. In one embodiment, the GPIO logic is coupled to a plurality of LEDs for status indication such as power good, read/write flash activity, etc., and other I/O devices. Flash memory controller 21 is coupled to one or more flash memory devices 3B.

In this embodiment, host computer 9B includes a function key set 8B, is connected to the processing unit 2B via an interface bus or a card reader when electronic data flash card 10B is in operation. Function key set 8B is used to selectively set electronic data flash card 10B in one of the programming, reset, data retrieving, code updating, and data resetting modes. The function key set 8B is also operable to provide an input password to the host computer 9B. The processing unit 2B compares the input password with the reference password stored in the flash memory device 3B, and initiates authorized operation of electronic data flash card 10B upon verifying that the input password corresponds with the reference password.

Also in this embodiment, a host computer 9B includes display unit 6B, is connected to the processing unit 2B when electronic data flash card 10B is in operation via an interface bus or a card reader. Display unit 6B is used for showing the data file exchanged with the host computer 9B, and for showing the operating status of the electronic data flash card 10B.

In accordance with an embodiment of the present invention, processing unit 2 includes a flash memory type algorithm for detection if a flash memory type is supported by the flash memory controller logic. Advance of flash memory technology has also created a greater variety of flash memory types for reasons of performance, cost and capacity. Due to the potential shortage, cost reason, the need for sourcing flexibility of flash memories, and the fact that unique control is required to access each different flash memory type, it is important to implement a processing unit with intelligent algorithm to detect and access the different flash memory types. The typical flash memory contains ID code which identifies the flash memory type, the manufacturer, and the features/parameters of the flash memory such as page size, block size, organization, capacity, etc. The intelligent algorithm controls processing unit 2 at reset to read the ID of flash memory 3, and to compare the ID against the table of flash memory types that are supported by the flash memory controller. If the flash memory 3 is not supported, the flash memory controller will not be able to access the flash memory 3, and the incompatibility can be indicated by LED via the output port of the flash memory controller. If the flash memory 3 is supported, the flash memory controller will be configured in the manner set forth below before the flash memory controller begins accessing the flash memory 3. Flash memory controllers with such intelligent algorithms are disclosed, for example, in co-pending U.S. patent application Ser. No. 11/466,759, entitled "Flash Memory Controller For Electronic Data Flash Card", which is incorporated herein by reference in its entirety.

The electronic data flash card is a flash memory system uses flash memories for data storage. Typically the system architecture of flash memory system includes flash memory controller having processor, ROM and RAM, in which the boot code and control code are residing in the ROM as ROM code. Upon power up, the processor fetches the boot code for execution, the boot code initializes the system components and loads the control code into RAM. Once the control code is loaded into the RAM, it takes control of the system. The control code includes drivers to perform basic tasks such as controlling and allocating memory, prioritizing the processing of instructions, controlling input and output ports etc. The control code also includes the flash type detection algorithm and the flash memory parameters data.

The ROM is a read only memory, after the flash memory controller design is done and moved into production, the software code in ROM is frozen and cannot be changed to support new flash types released to the market in the later time. In such a situation, a new flash memory controller has to be developed to support new flash memories from time to time, which is costly and time consuming.

Figure 1D:
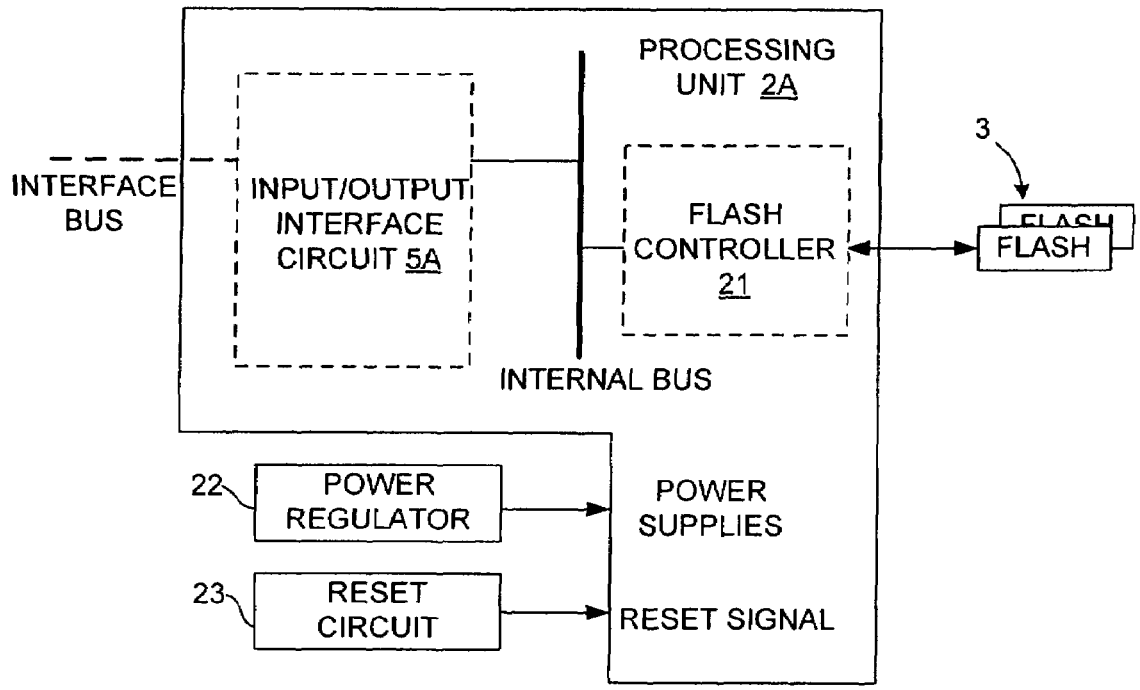
FIG. 1(D) is a block diagram of a processing unit utilized in an electronic data flash card in accordance with another embodiment of the present invention.

FIG. 1(D) shows processing unit 2A of FIG. 1(B) in additional detail. Electronic data flash card 10A includes a power regulator 22 for providing one or more power supplies. The power supplies provide different voltages to processing unit 2A and other associated units of electronic data flash card 10A according to power requirements. Capacitors (not shown) may be required for power stability. Electronic data flash card 10A includes a reset circuit 23 for providing a reset signal to processing unit 2A. Upon power up, reset circuit 23 asserts a reset signal to all units. After internal voltages reach a stable level, the reset signal is then de-asserted, and resisters, and capacitors (not shown) are provided for an adequate reset timing adjustment. Electronic data flash card 10A also includes a quartz crystal oscillator (not shown) to provide the fundamental frequency to a PLL within processing unit 2A.

In accordance with an embodiment of the present invention, input/output interface circuit 5A, reset circuit 23, and power regulator 22 are integrated or partially integrated within processing unit 2A. Such a high integration substantially reduces an overall space needed, complexity, and a cost of manufacturing. Compactness and reduced cost are key factors to removable devices such as the electronic data flash cards described herein. Modern IC (Integrated Circuits) packaging can integrate discrete IC components with different technologies and material into one IC package. For example, the input/output interface circuit is analog and digital mixed circuitry, which can be integrated into one MCP (Multi-Chip Package) with the processing unit. The reset circuit and power regulator are analog circuitry, which can also be integrated into the MCP with the processing unit. The nature of mixed signal IC technology allows a hybrid integration of both analog and digital circuitry. Therefore, a higher integration can be incorporated into the same chip/die for the processing unit which includes an input/output interface circuit, a flash memory controller, a reset circuit, and a power regulator.

In accordance with another aspect of the present invention, an electronic data flash card includes boot code and control code stored in the flash memory instead of in the flash memory controller ROM. As a result, the boot code and control code can be updated in the field without having to change the flash memory controller. To describe features of the present invention further, refer now to the following description in conjunction with the accompanying figures.

Although embodiments of the present invention disclosed herein are described in the context of a flash card, embodiments of the present invention may apply to other types of memory systems and still remain within the spirit and scope of embodiments of the present invention.

Figure 2A:
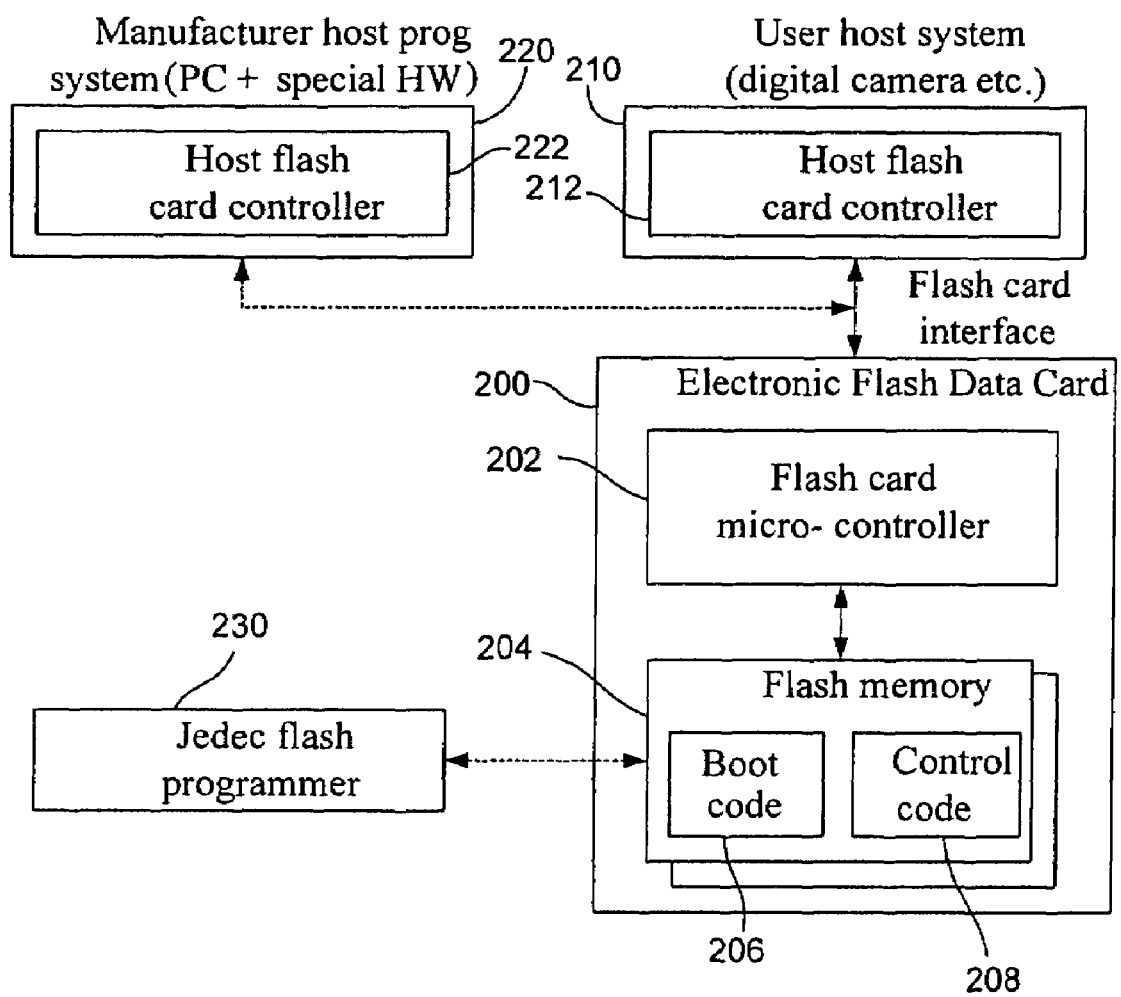
FIG. 2(A) is a block diagram of a flash memory system in accordance with an embodiment of the present invention in which the flash memory includes both the boot code and the control code.

FIG. 2(A) is a block diagram of a flash memory system 200 in accordance with an embodiment of the present invention. The flash memory system 200 includes a flash memory controller 202 and a flash memory 204. The flash memory 204 stores boot code 206 and control code 208. Note that the term flash memory represents one or more flash memory devices. If there are more than one flash memory device, the boot code 206 and control code 208 can be stored on one of the flash memory devices or alternatively can be stored on multiple flash memory devices. The flash memory system 200 is adapted to be coupled to a user host 210 during normal-mode operation. The user host 210 includes a host flash card controller 212.

During the programming-mode, the flash memory system 200 is adapted to be coupled to a manufacturer host 220 or alternatively to a Jedec flash programmer 230. The manufacturer host 220 can be a personal computer (PC) with special hardware. The manufacturer host 220 includes a host flash card controller 222, which can be a special card interface controller dedicated to volume production of flash cards.

In a normal-mode operation, the flash memory system 200 stores data that is provided by the user host 210, which may be a digital camera or PC or another host. The flash memory system 200 is implemented as a flash card. The flash memory system 200 can store various types of data including image data and other types of multi-media data. Accordingly, the flash memory system 200 can also be referred to as a multi-media card (MMC). The data stored in the flash memory system 200 can be later sent as file attachment in an e-mail, printed, or transferred to another host.

The user host card controller 212 handles flash card protocol translation between the flash memory system 200 and the user host 210, which enables the user host 210 to transfer files so that various host operating system (OS) software can share information. For example, the user host card controller 212 enables data to be read by a user PC via email. Software in the user host 210 handles file system functions, such as providing a file application interface and a user accessible device driver.

Before the flash memory system 200 is shipped to an end user, information is stored in the flash memory system 200 to ensure that it functions correctly. The information includes the boot code 206 and the control code 208, as well as information specific to the flash memory (e.g., manufacturer, identification, etc.). The boot code 206 is software that initializes the flash memory system 200 during the early phase of the booting sequence. The boot code 206 also determines the amount of available memory and determines how to access it. The control code 208 contains necessary information for exercising the initial booting sequence and information for enabling the flash memory controller 202 to access the flash memory device 204. The control code 208 includes parameter settings and a detailed list of information relating to flash memory device, as well as card identification (card ID) and card specific data (CSD).

Because the boot code 206 and the control code 208 are stored in the flash memory device instead of the flash memory controller ROM, the code in the ROM as well as the physical size of the ROM can be minimized.

In programming-mode operation, the manufacturer host 220 is used to program the flash memory 204 via the flash memory controller 202. Alternatively, a Jedec programmer 230 can be used to directly program the flash memory 204. Upon completion of the programming, the manufacturer host 220 diagnoses the flash memory system 200 to ensure that it is functioning properly.

Because the boot code and control code is stored in the flash memory 204, different brands or types of flash memory can be supported by the same flash memory controller 202 without having to change it. As such, the flash memory controller is universal to various brands and types of flash memory. This is because each flash memory device of the flash memory 204 stores the boot and control code unique to each flash memory. Parameters for different types of flash memory device are defined in the control code and in a library image file. Accordingly, a single flash memory controller can support multiple brands and multiple types of flash memory. In other words, the flash memory controller would not have to be changed for each brand or type of flash memory. This significantly reduces the inventory when various cards having different specifications (i.e., different flash memories) are in mass production.

Furthermore, because the boot code and the control code are stored in the flash memory, the boot and control codes can be updated in the field. As such, the end user can download updated code. Such code can be provided via various means including Internet web support, e-mail, etc., and can be downloaded using a PC.

Figure 2B:
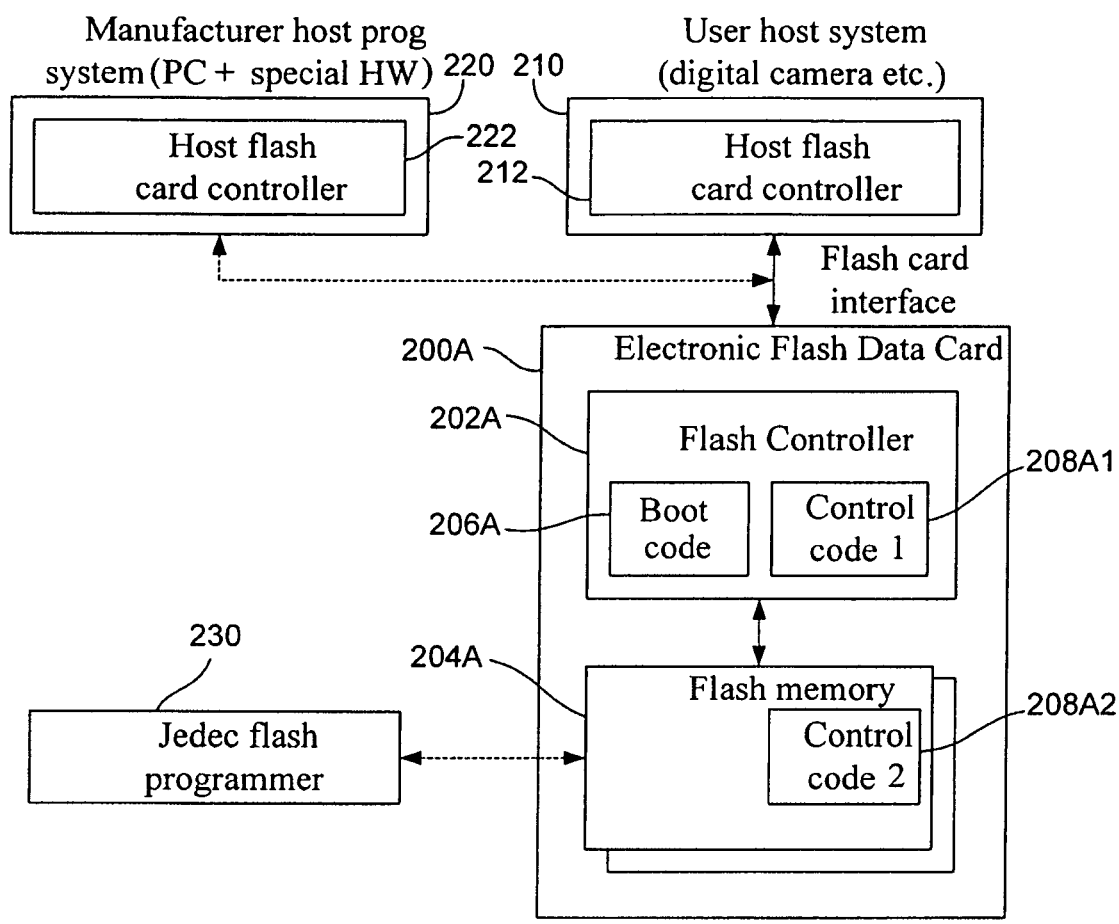
FIG. 2(B) is a block diagram of a flash memory system in accordance with another embodiment of the present invention in which the flash memory includes boot code and a portion of the control code.

FIG. 2(B) is a block diagram of a flash memory system 200A in accordance with an alternative embodiment of the present invention. Similar to conventional systems, flash memory system 200A includes boot code 206A and a first version of the control code 208A1 (i.e., "Control code 1") in the ROM portion of flash controller 202A, and also includes an updated version of the control code 208A2 (i.e., "Control code 2") in flash memory 204A. In this embodiment, the boot code is loaded into RAM and is used to determine whether initial control code 208A1 or updated control code 208A2 are to be used. This embodiment does not allow updates to the boot code, and does not minimize the ROM size as in the embodiment shown in FIG. 2(A), but facilitates updates to the control code that allow, for example, bugs in the initial control code 208A1 to be addressed in the field.

Figure 3:
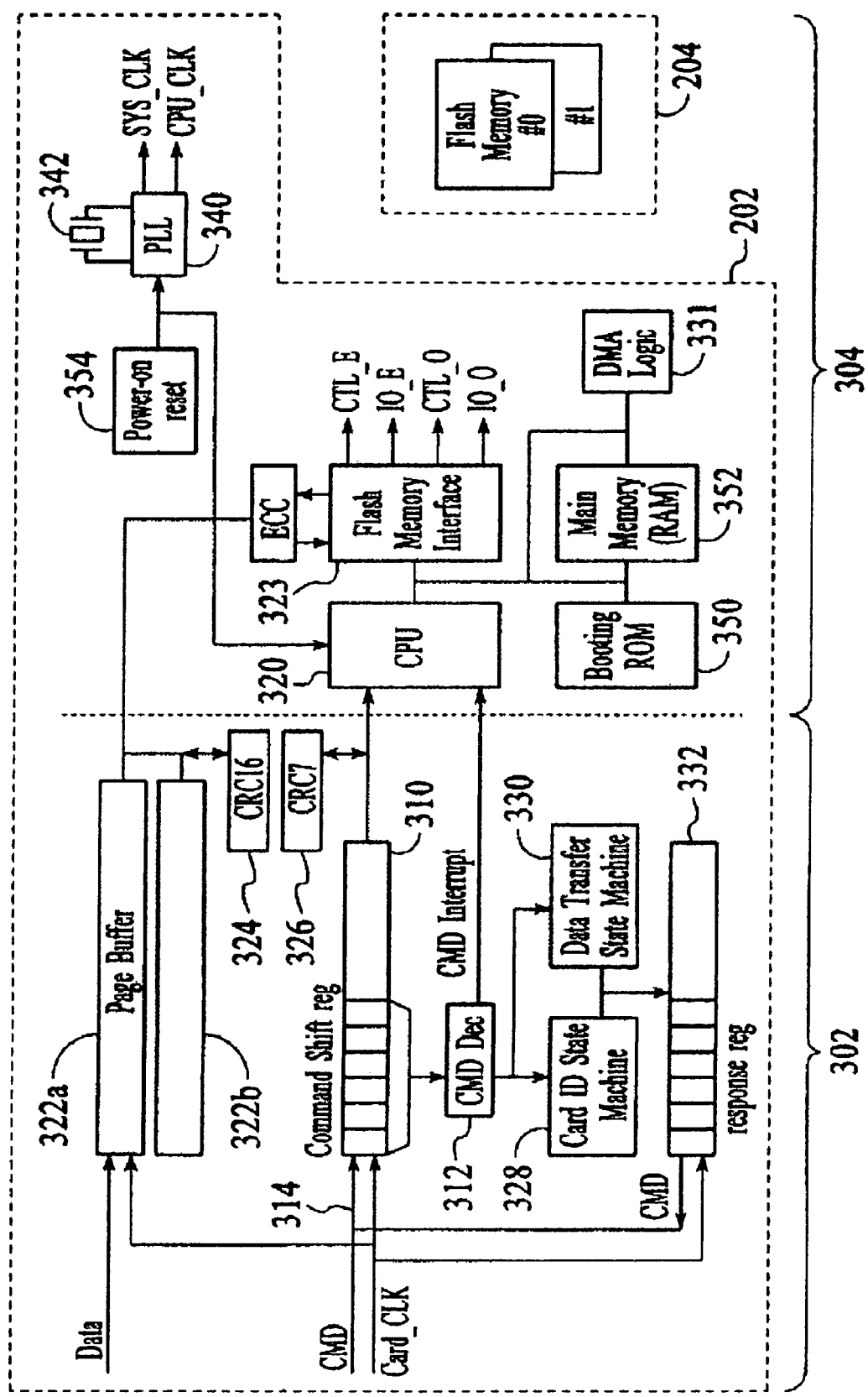
FIG. 3 is a block diagram of the flash memory controller of FIG. 2(A) in accordance with one embodiment of the present invention.

FIG. 3 is a block diagram of the flash memory controller 202 of FIG. 2(A) according to an embodiment of the present invention. For ease of illustration, the flash memory controller 202 of FIG. 3 is shown in two domains, a card clock domain 302 and a CPU (flash memory controller) clock domain 304. The card clock domain 302 is controlled by a card clock (labeled "card_clk"), which is provided by a host (not shown) to synchronize the command and data protocols. Note that the term host system or host, when used generally, can include any type of host including but not limited to a user host, a manufacturer host, a Jedec programmer, etc. All handshake signals follow the card clock to execute transactions.

The CPU clock domain 304 is controlled by a CPU clock (labeled "CPU_clk"). The CPU clock controls all flash memory operations as well as CPU activities. The speed of the CPU clock can be high for efficient execution (e.g., two times or more faster than the card clock). The speed of clocks can and will increase as technology advances, and their precise speeds will depend on specific application.

Referring to the card clock domain 302, a command shifter register 310 is used to latch a command via a command line 314 from a host whenever the shift register 310 sees a start bit sending from the host. As stated previously, the general term host can be any type of host including but not limited to a user host, a manufacturer host, etc. The command line 314 is bi-directional, and responses from the flash memory system to the host can use the command line 314 for protocol transfers.

A command decoder 312 generates a command interrupt, which is sent to CPU 320. Double page buffers 322a and 322b are used to increase the performance of flash memory operations. In this specific embodiment, double page buffers 322a and 322b are 2K bytes buffers, but can be more or less depending on specific application. The flash memory controller 202 alternates between the page buffers 322a and 322b to optimize traffic between the host and the flash memory controller 202. While the page buffer 322a is in use sending data to a flash memory interface 323, the page buffer 322b remains available to receive data from the host. Conversely, while the page buffer 322b is in use sending data to the host, the page buffer 322a remains available to receive data from the flash memory.

A cyclic redundancy check unit 324 (labeled "CRC16") checks checksum for larger bytes of data (e.g., 512 or more bytes). A cyclic redundancy check unit 326 (labeled "CRC7") checks checksum for smaller bytes of data. Such data includes, for example, command or response packet checks. A card identification (ID) state machine 328 ensures that the flash memory controller 202 is recognized by the host. Each state involves complex operations handled by the firmware of the CPU 320. A data transfer state machine 330 facilitates a direct memory access (DMA) engine logic 331 to alleviate the CPU 320 when downloading boot or control code. The DMA logic 331 transfers large blocks of code from the flash memory 204 to the main memory (RAM) 352. This speeds up system execution by running in RAM-based memory, as well as relieves the CPU. A response register 332 facilitates data transfer from the flash memory system to the host.

Referring to the CPU clock domain 304, the CPU 320 is the main engine for control sequencing and is also responsible for handling firmware sequencing. A phase locked loop (PLL) circuit 340 with a crystal 342 generates the CPU clock and a system clock (labeled "sys_clk"), which are primarily used for the CPU 320 and the flash memory interface 323. The clock speeds affect flash timing. A preferred speed is 20 Mhz state tracking, and may vary depending A phase locked loop Circuit (PLL) 340 with a crystal 342 can be replaced by other solutions. For example, a RC oscillator can also be used in FIG. 3 with less cost than PLL with a crystal. Because a crystal can be integrated in a single chip on a silicon substrate, it may occupy space on a card PCB and make the card size not fit in a standard size in some cases. RC oscillator can be fully implemented in a single chip with minimum external components (also less cost). A Ring-Oscillator is another solution to replace PLL with a crystal on the specific application.

A read-only memory (ROM) 350 stores code that handles the downloading of code to the flash memory device 204 and transfers control to the boot code residing in the flash memory 204. Alternatively, the ROM 350 can be replaced by a fixed-type electrically erasable ROM (EEPROM) or a NOR type flash memory. Such alternatives would be useful for engineering experiment purposes.

A main memory static random access memory (SRAM) 352 stores executable code, including the boot code and control code, which are downloaded from the flash memory 204 when the flash memory system boots up. Depending on complexity of the control code, the RAM 352 can be integrated with the CPU 320. A rich-RAM based 8051 controller is an example of a RAM integrated with a CPU.

The flash memory interface circuit 323 interfaces with the flash memory device 204 during flash memory access operations, to fulfill the tasks of programming, reading, erasing flash pages or blocks based on commands sent from the host.

The flash card uses a block-based addressing scheme, as opposed to a random addressing scheme, which is common with dynamic random access memory (DRAM) systems. Block-based addressing involves a command and an address, which are sent over a data bus and involves a block of data, which is read or written. A benefit of flash memory is that the data bus is used to send both commands and addresses, in addition to sending user data. As a result, fewer pins are needed on a flash memory chip. Hence, costs are reduced.

Figure 4:
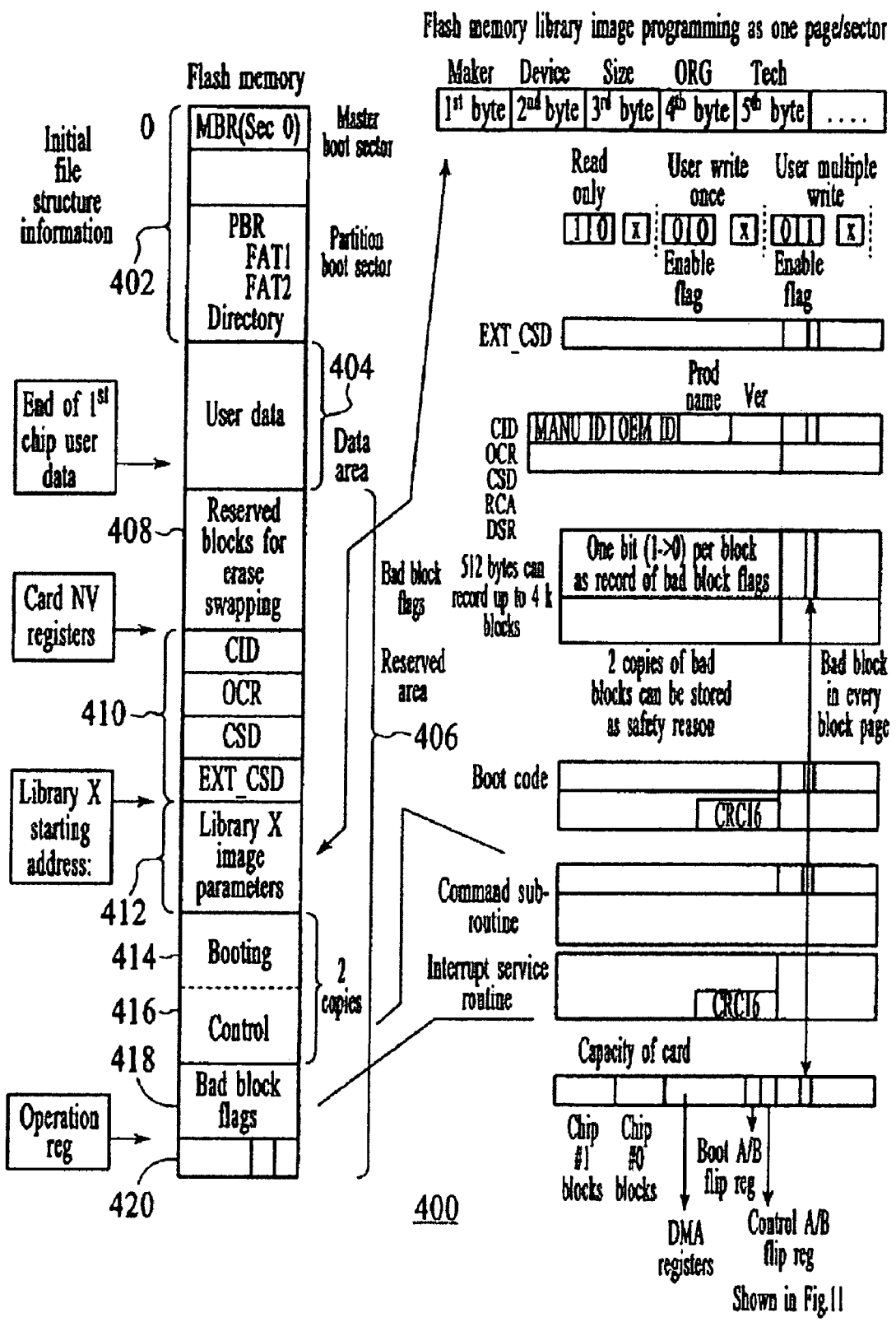
FIG. 4 is a diagram of a flash memory structure in accordance with one embodiment of the present invention.

FIG. 4 is a diagram of a flash memory structure 400 in accordance with the present invention. A reserved area 406 in a final block of flash memory device is used for storing final block data of information associated with the flash memory operations (e.g., the boot code and control code). Such information includes reserved blocks 408, card non-volatile (NV) registers 410, a library image file 412, boot code 414, control code 416, a bad block map 418, and operation registers 420. The reserved area 406 actually has one or more spare areas so that a back-up copy of the old final block data is saved. Additional spare areas when available are for back-up copies of older final block data.

The reserved blocks 408 are used for erase swapping. After old final block data is erased, new data is copied back. Wear leveling problems are not at issue in the reserved area 406, since updates to either codes or registers occur very infrequently compared to normal data transfers.

The card non-volatile (NV) registers 410 contain necessary parameters, such as card identification (CID) data that the host needs to know to transfer protocols. The library image file 412 includes a maker byte, a device byte, and other information read from a flash command.

With regard to the boot code 414 and the control code 416, at least two copies of each are stored in the flash memory device. This provides a back-up copy during updates. During an update, only one of the two copies is updated to reflect the latest changes. The other copy is saved as a back-up copy without any changes, in case any unknown failures occur during the update. Also, these two copies are toggled such that during a subsequent update, the original back-up copy is updated with the latest code, and the copy of the first update becomes the new back-up copy. While two copies are stored in this specific embodiment, more copies can exist if the memory size is sufficient. Additional blocks can be reserved to accept larger sizes of boot and control code.

The bad block map 418 records the bad blocks. Bad blocks in the flash memory may manifest at various times, including when the block was first created, and can occur in later stages while being erased or programmed. In a specific embodiment, each block is represented by one bad-block bit, where a logical one ("1") represents a good block and a logical zero ("0") represents a bad block. The bad block mapping table also indicates the remaining life of the flash memory based on the ratio of good blocks to bad blocks. All flash memory brands have specification-defined position for the bad-block bit, which is known after reading the maker code. Such positions are typically located several bytes after the beginning position of a spare data field. The reserved area 406 would not include any bad block(s) detected during a block scan.

The operation registers 420 contain checksum data and address pointers. The address pointers are shared with DMA flash address starting registers. Also stored in this sector is basic information that the flash card controller requires, such as pointers to the copies of the boot code and control code, the start address, and the user storage capacity of the flash memory system.

The user storage capacity of the flash memory device is calculated from a flash memory chip specification volume known from reading organization bytes after a "90h command" ID is read. The user storage capacity is the flash memory chip specification volume minus the reserved blocks and the bad blocks.

The flash memory system can have one or more flash memory devices depending on the requirements of the specific application. If more than one flash memory device is used, the flash memory devices are preferably the same make and type. However, they need not be the same make or type.

FIG. 4A is put forward to enhance FIG. 4 in accordance with one embodiment of the present invention. Referring to FIG. 4, according to one embodiment, a reserved area 406 locates in a final block of a flash memory device with boot code and control code stored therein. Here are two corner cases: (1) the final block is a bad block; (2) FLASH ID is recorded in a flash controller (for example, a new flash with a new ID applied), so the controller cannot figure out the physical address of the last block. FIG. 4A defines the first block 406A as an instructing block which points to a location of a reserved area 406. This will solve the two corner cases. Most of flash chips are guaranteed the first block is not a bad block; so even the last block is a bad block, the first block will re-location the reserved block 406 to another location. Without an ID number (e.g., no flash size or last block address information), the first block address is universal for all flash chips.

In FIG. 4B, in a worst case where the first block is not guaranteed to be a good block, according to one embodiment, the default reserved area 406 can be set as the last block or a second block as default. So, FIG. 4A can provide an enhanced safety.

Figure 5:
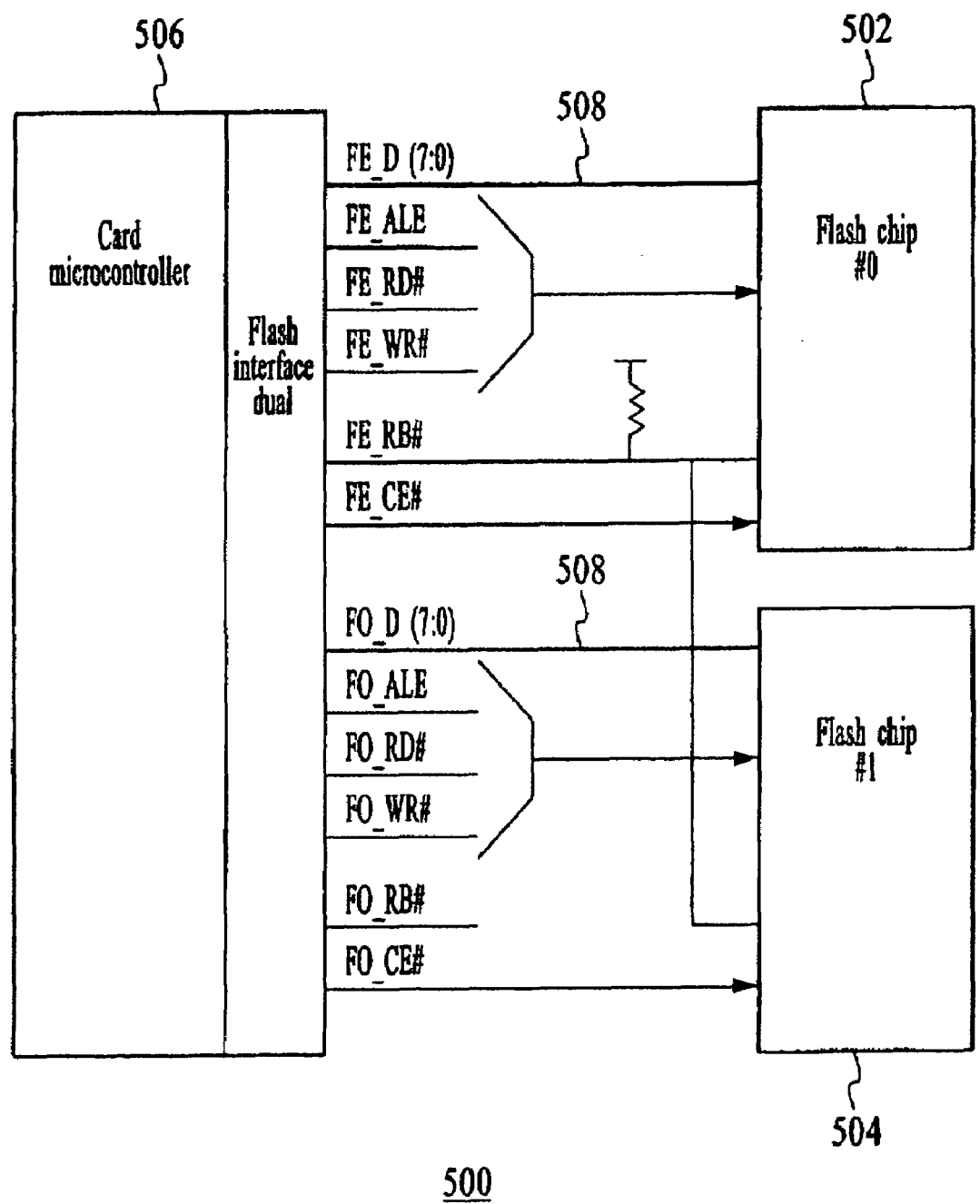
FIG. 5 is a block diagram of a flash memory system, including two flash memory devices using a dual-channel configuration, in accordance with one embodiment of the present invention.

FIG. 5 is a block diagram of a flash memory system 500 using a dual-channel configuration in accordance with one embodiment of the present invention. Referring to FIG. 5, two flash memory devices 502 and 504 are coupled to a flash memory controller 506 via an input/output (I/O) bus 508. I/O bus 508 is double the width of a bus that would be used for only one flash memory device. Accordingly, I/O bus 508 performs twice as fast as a bus using single channel control logic.

The flash memory devices 502 and 504 are 8-bit devices and the address space of the flash memory devices 502 and 504 are rearranged by interface logic to enable access to them. Their sector sizes are 512 bytes. The ready/busy# line (labeled "FE_RB#") indicates an internal busy status.

Figure 6:
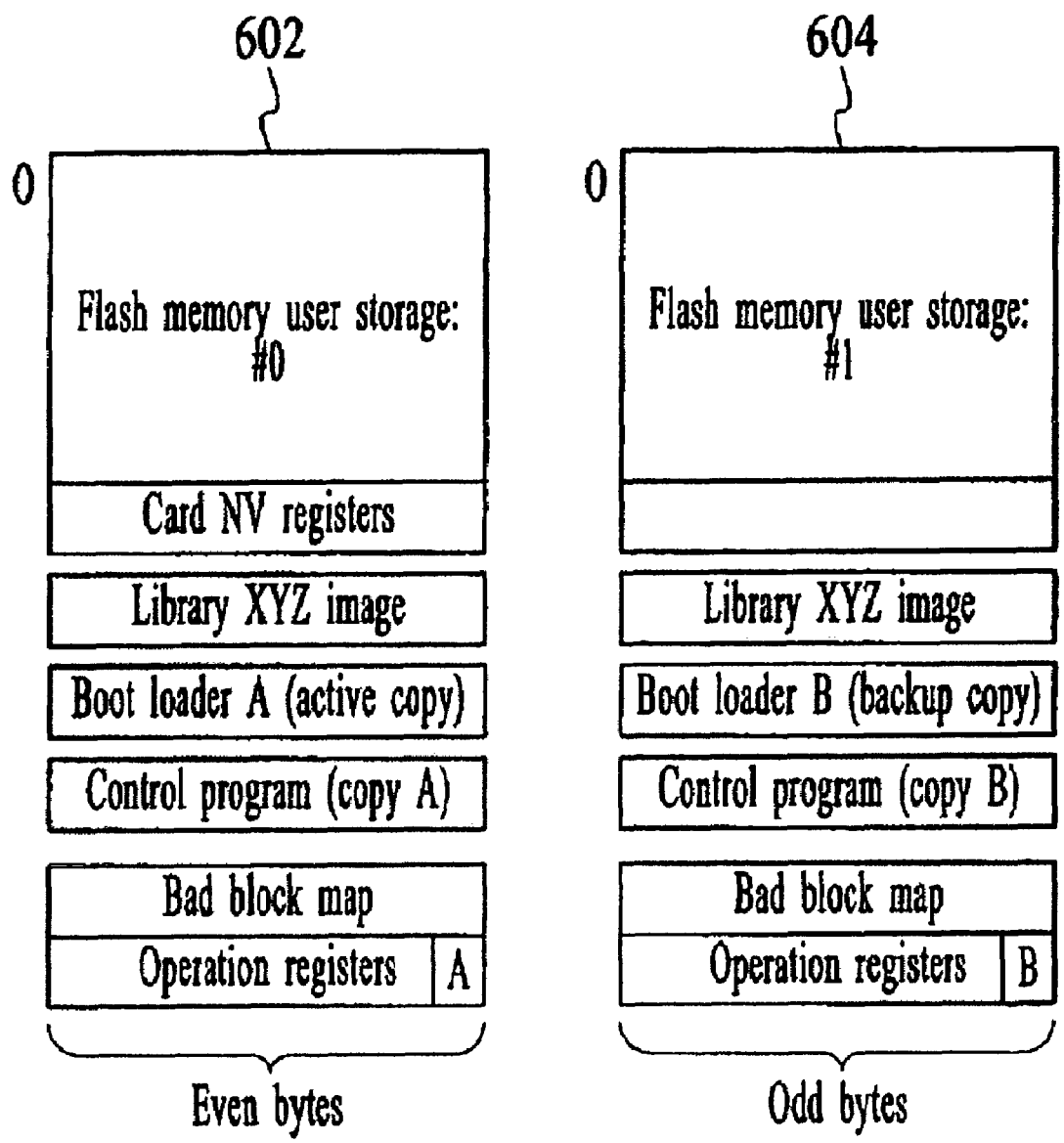
FIG. 6 is a diagram of flash memory structures for the flash memory devices of FIG. 5 in accordance with one embodiment of the present invention.

FIG. 6 is a diagram of flash memory structures 602 and 604 respectively for the flash memory devices 502 and 504 of FIG. 5 in accordance with one embodiment of the present invention. The flash memory structures 602 and 604 are similar to the flash memory structure of FIG. 4, except that the physical addresses of flash memory are divided into two flash memory devices. The flash memory structure 602 is designated for even bytes and the flash memory structure 604 is designated for odd bytes.

Figure 7:
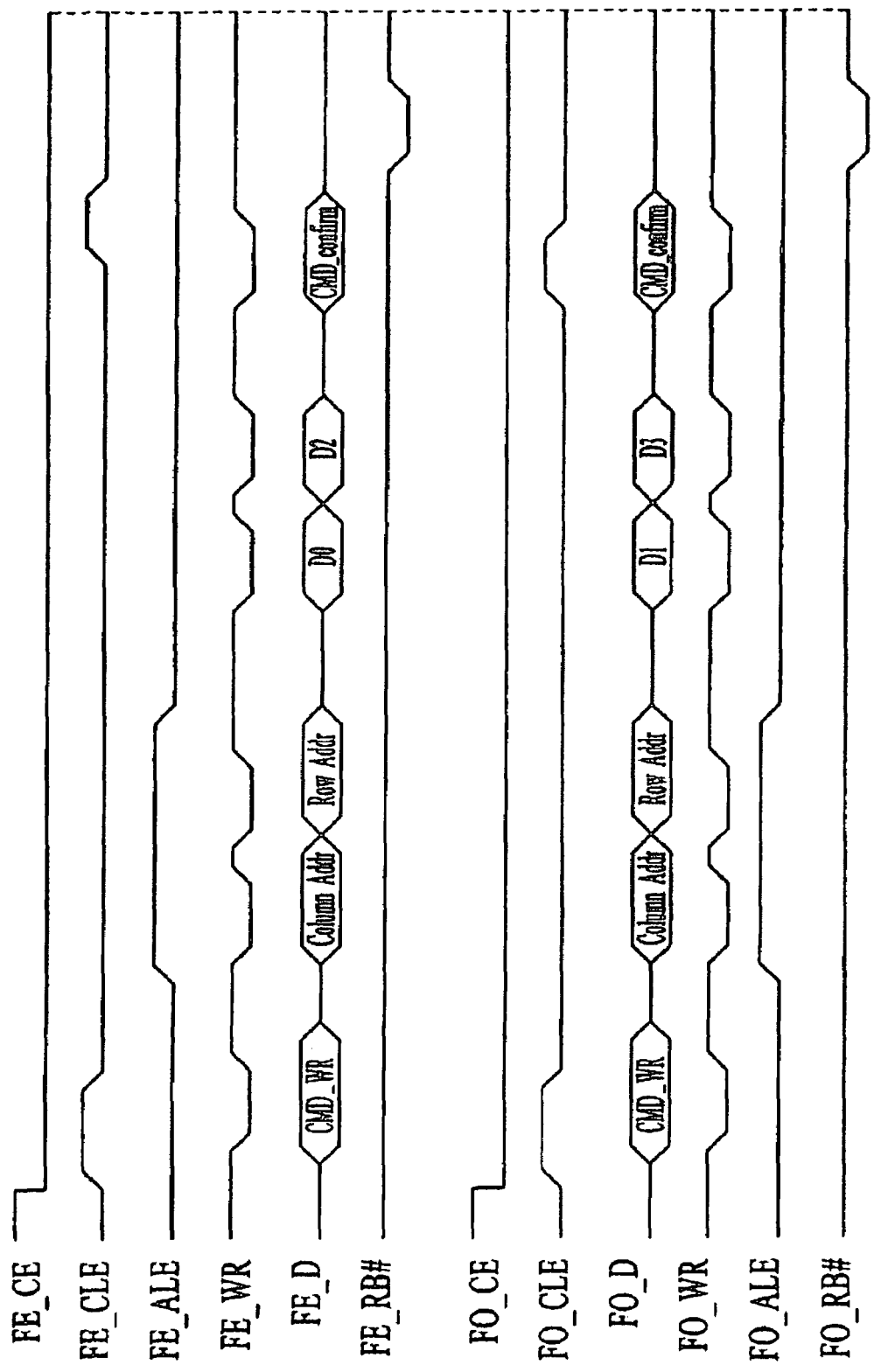
FIG. 7 is a timing diagram for the flash memory system of FIG. 5 in accordance with one embodiment of the present invention.

FIG. 7 is a data write timing diagram for the flash memory system 500 of FIG. 5 in accordance with one embodiment of the present invention. First, during a command phase (labeled "CMD_WR"), a command is written to the flash memory devices 502 and 504 in accordance with their flash memory device specifications. Next, during an address phase (labeled "Column Addr" and "Row Addr"), column and row addresses are accessed in two separate consecutive cycles. The specific number of cycles will depend on a specific application. Next, during a data phase (labeled "D0"-"D3"), data is sent to the flash memory devices 502 and 504. This is done in a staggered format to gain performance. Two sector buffers, each having 512 bytes, are used for odd and even bytes sent to the flash memory devices 502 and 504. In a final phase (labeled "CMD_Confirm"), respective error correction code (ECC) bytes associated with even and odd bytes are written in spare locations of each sector. With regard to the last signal (FO_RB#), the waveform represents the Ready/Busy pin output for flash memory device 504. The FO_RB# pin is disconnected. Because the RB# pins for the flash memory devices 502 and 504 are tri-stated, they can alternatively be tied together.

Figure 8:
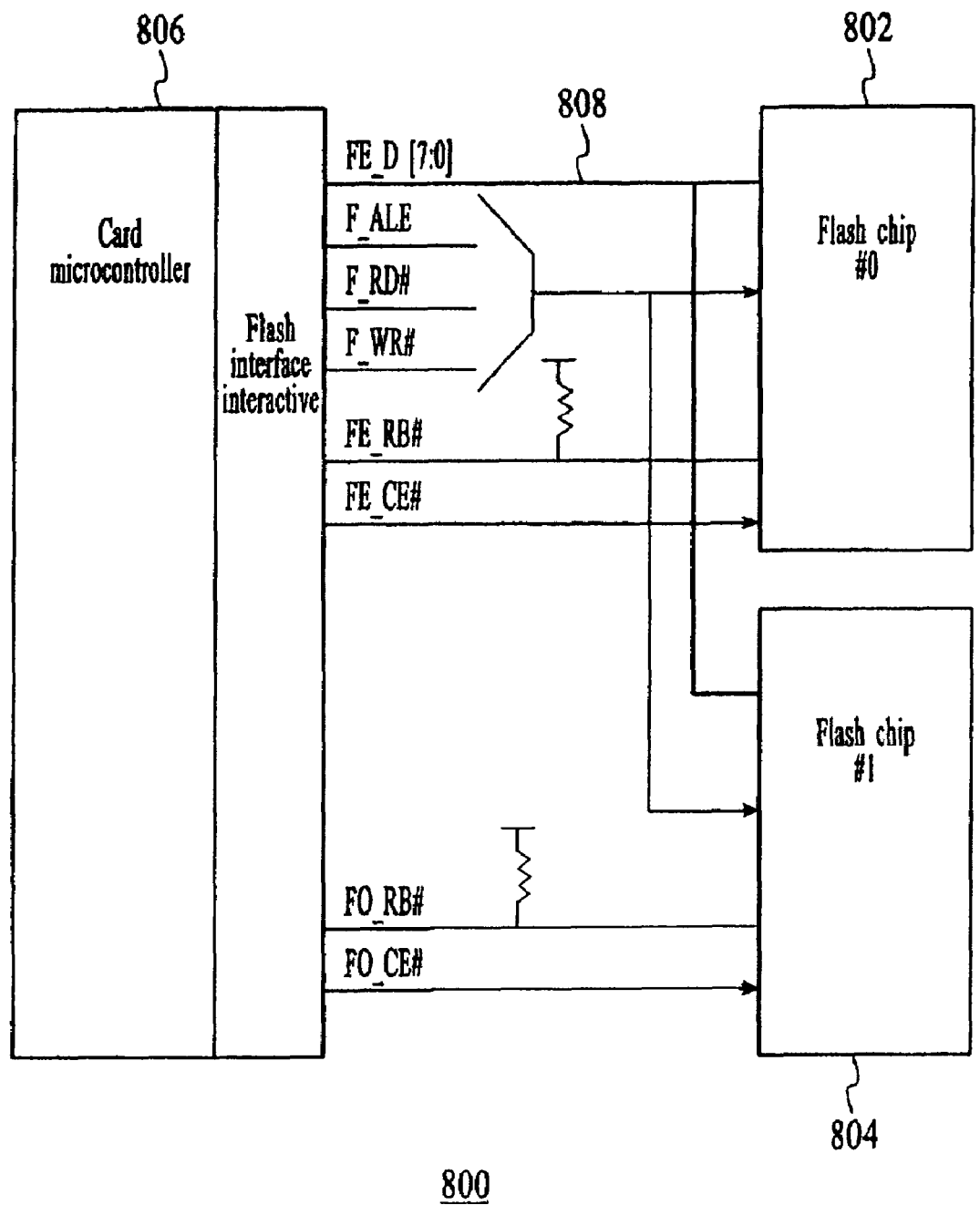
FIG. 8 is a block diagram of a flash memory system including two interleaved flash memory devices in accordance with one embodiment of the present invention.

FIG. 8 is a block diagram of a flash memory system 800 including two interleaved flash memory devices 802 and 804 in accordance with the present invention. The flash memory devices 802 and 804 are coupled to a flash memory controller 806 via an I/O bus 808. The I/O bus 808 is timeshared by flash memory devices 802 and 804. Accordingly, commands can be sent to both flash memory devices 802 and 804 to fully utilize the bandwidth of the I/O bus 808. Because the I/O bus 808 is shared, the flash memory controller 806 pin count is reduced. Yet the flash memory devices 802 and 804 have separate chip enable lines (labeled "FE_CE#" and "FO_CE#") and ready/busy lines (labeled "FE_RB#" and "FO_RB#").

Figure 9:
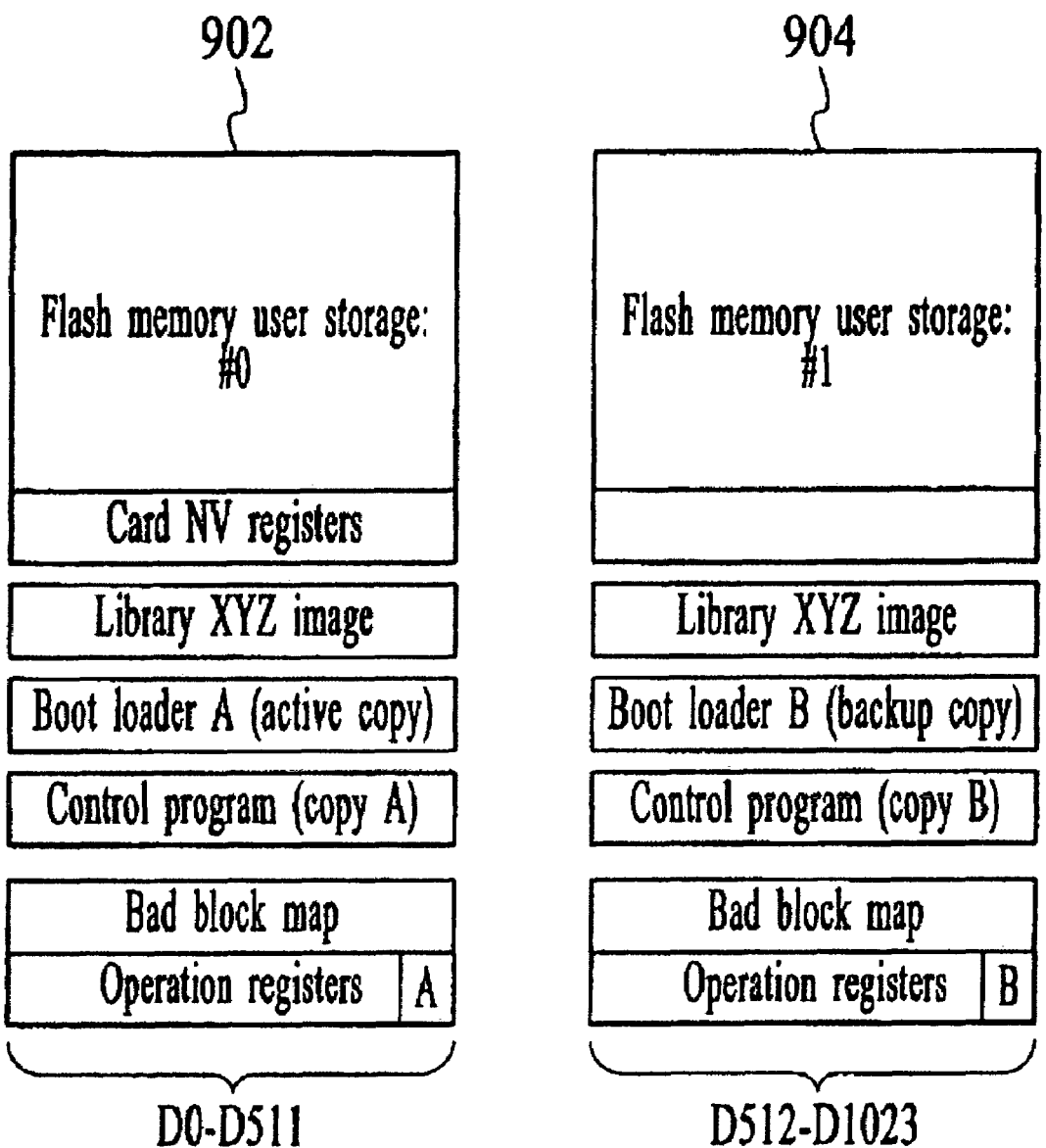
FIG. 9 is a diagram of flash memory structures for the flash memory devices of FIG. 8 in accordance with one embodiment of the present invention.

FIG. 9 is a diagram of flash memory structures 902 and 904 respectively for the flash memory devices 802 and 804 of FIG. 8 in accordance with one embodiment of the present invention. The flash memory structures 902 and 904 are similar to the flash memory structures 602 and 604 of FIG. 6. All data from the registers, the library image file, and the boot and control codes are aligned sequentially and separated into the two flash memory structures 902 and 904. As shown, the flash memory structure 902 is designated for a first series of bytes (labeled "D0-D511"), and the flash memory structure 904 is designated for a second series of bytes (labeled "D512-D1023").

Figure 10:
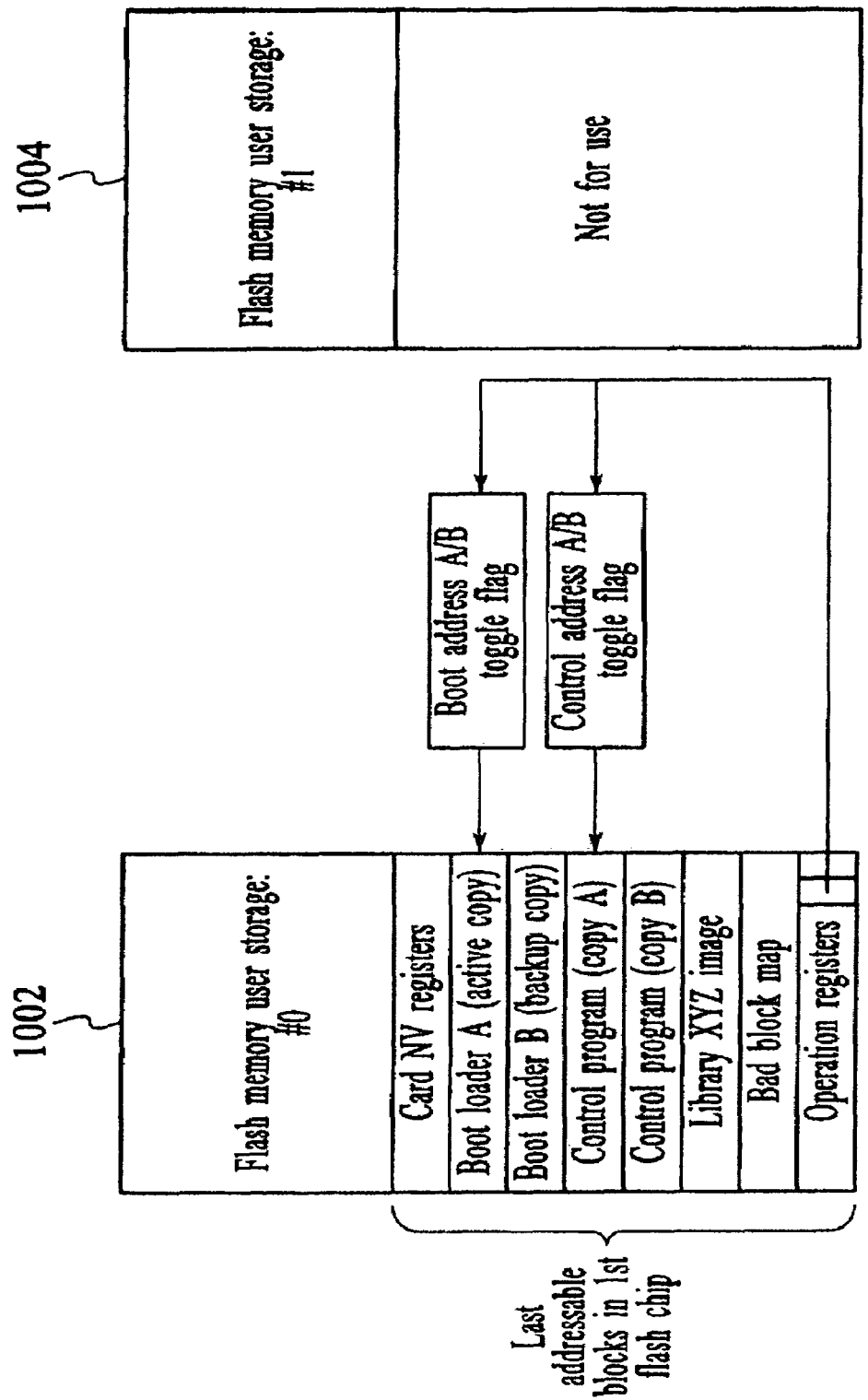
FIG. 10 is a diagram of flash memory structures for the flash memory devices of FIG. 8 in accordance with another embodiment of the present invention.

FIG. 10 is a diagram of flash memory structures 1002 and 1004 respectively for the flash memory devices 802 and 804 of FIG. 8 in accordance with another embodiment of the present invention. The flash memory structures 1002 and 1004 differ from the flash memory structures 902 and 904 of FIG. 9 because the registers, boot code, and control code, library image file, bad block map, and operation registers are stored on one flash memory device. The interleave feature can be turned on after the control code is successfully downloaded. The interleave feature is turned off every time the bad block map or other bits are changed. This is also the case with the dual-channel feature described above.

Figure 11:
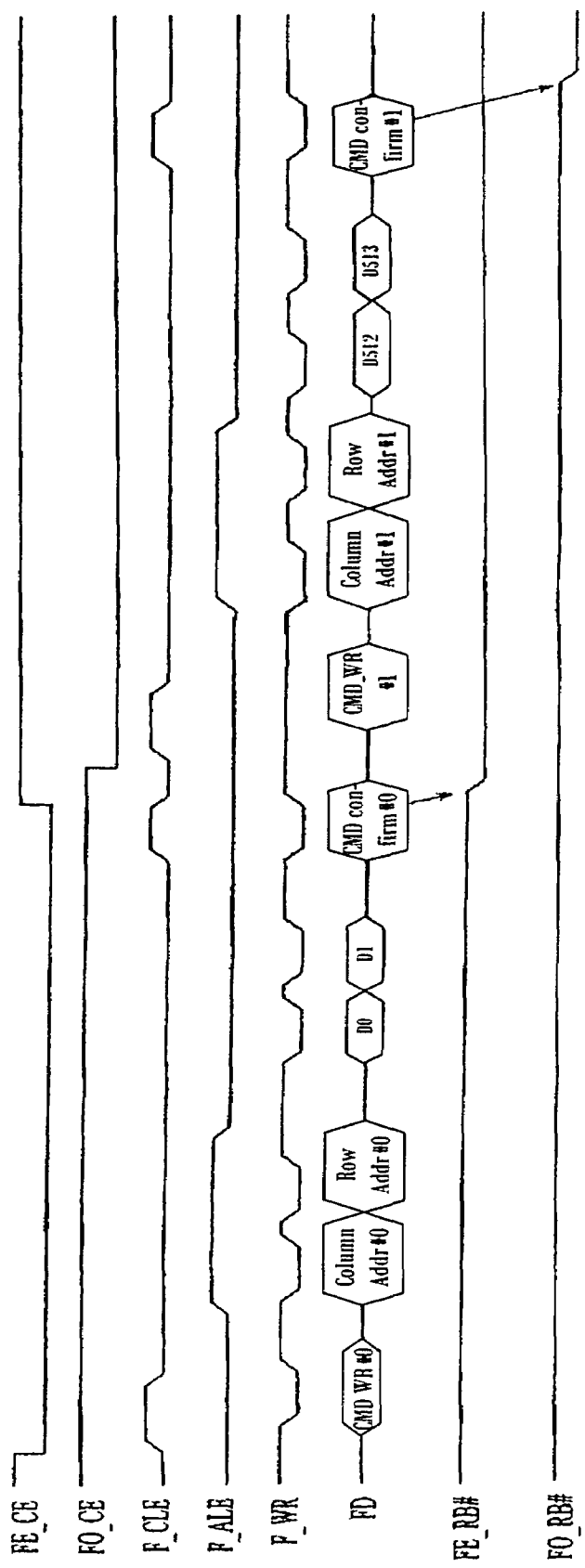
FIG. 11 is a timing diagram for the flash memory system of FIG. 8 in accordance with one embodiment of the present invention.

FIG. 11 is a timing diagram for the flash memory system of FIG. 8 in accordance with one embodiment of the present invention. Access to the flash memory devices begins with the first flash memory device and continues with the second flash memory device. Because the I/O bus is timeshared between the first and second memory devices, access alternates between the two. The sequence is similar to that of the timing diagram of FIG. 7. With both flash memory devices, after a confirm-command is issued, a CE# is released and an RB# is asserted for internal busy status.

Figure 12:
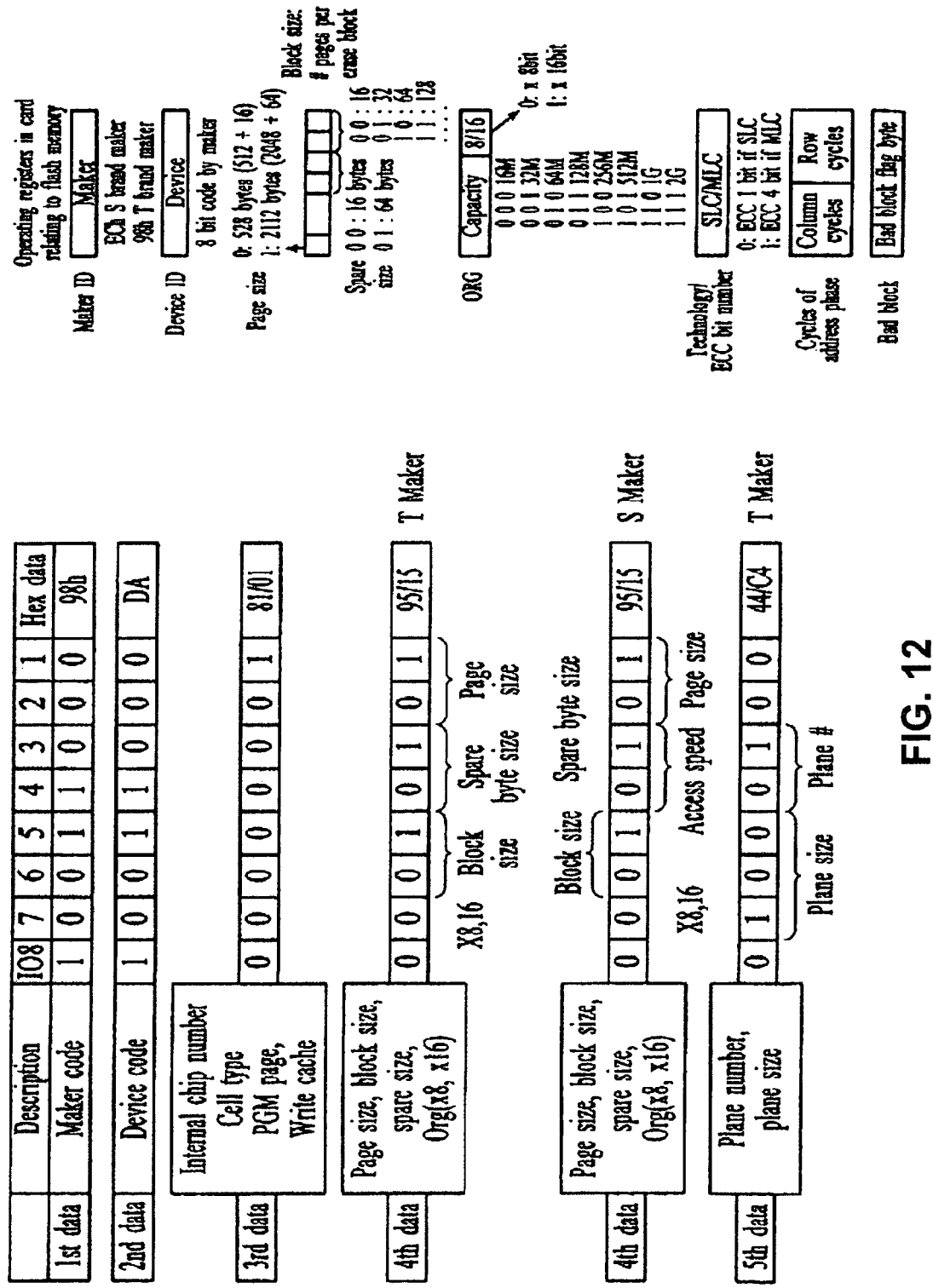
FIG. 12 is a diagram showing an organization of flash memory data in accordance with one embodiment of the present invention.

FIG. 12 is a diagram showing an organization of data in accordance with one embodiment of the present invention. Information critical to the operation of a flash memory device is provided by the manufacturer. The control code provides this information to the flash memory controller. Each brand and type of flash memory device has its own addressing scheme and capacities. The operating registers in the flash memory device provide this information, which can be grouped together into one page for easy access by the flash memory controller. The data organization of two major brands of flash memory, Maker T and Maker S, are shown. A first set of data includes maker code. A second set of data includes a device ID. All brands and types of flash memory device have an associated device ID. A special command ("code 90h") is issued after a second address phase. This is the only necessary control for reading the flash memory device ID. A third set of data includes an internal chip number and a cell type.

A fourth set of data returned has different meanings for different flash devices. For example, an error correction code (ECC) generation circuit will be a 1-bit circuit if using a single level cell (SLC) structure or will be a 4-bit circuit if using multi-level cell (MLC) structure. The operating registers also include an address cycle register, which facilitates read/write access. Other necessary information includes block size, page size, and spare size.

If more than one flash memory device of the same brand and type is used in a flash card, the flash memory controller ROM needs to only read the first flash memory device to gather needed information. If multiple brands or types of flash memory devices are used, the ROM would read each flash memory device. If more than one flash memory device is used, the same brand and type is preferred in order to minimize the control code.

Figure 13:
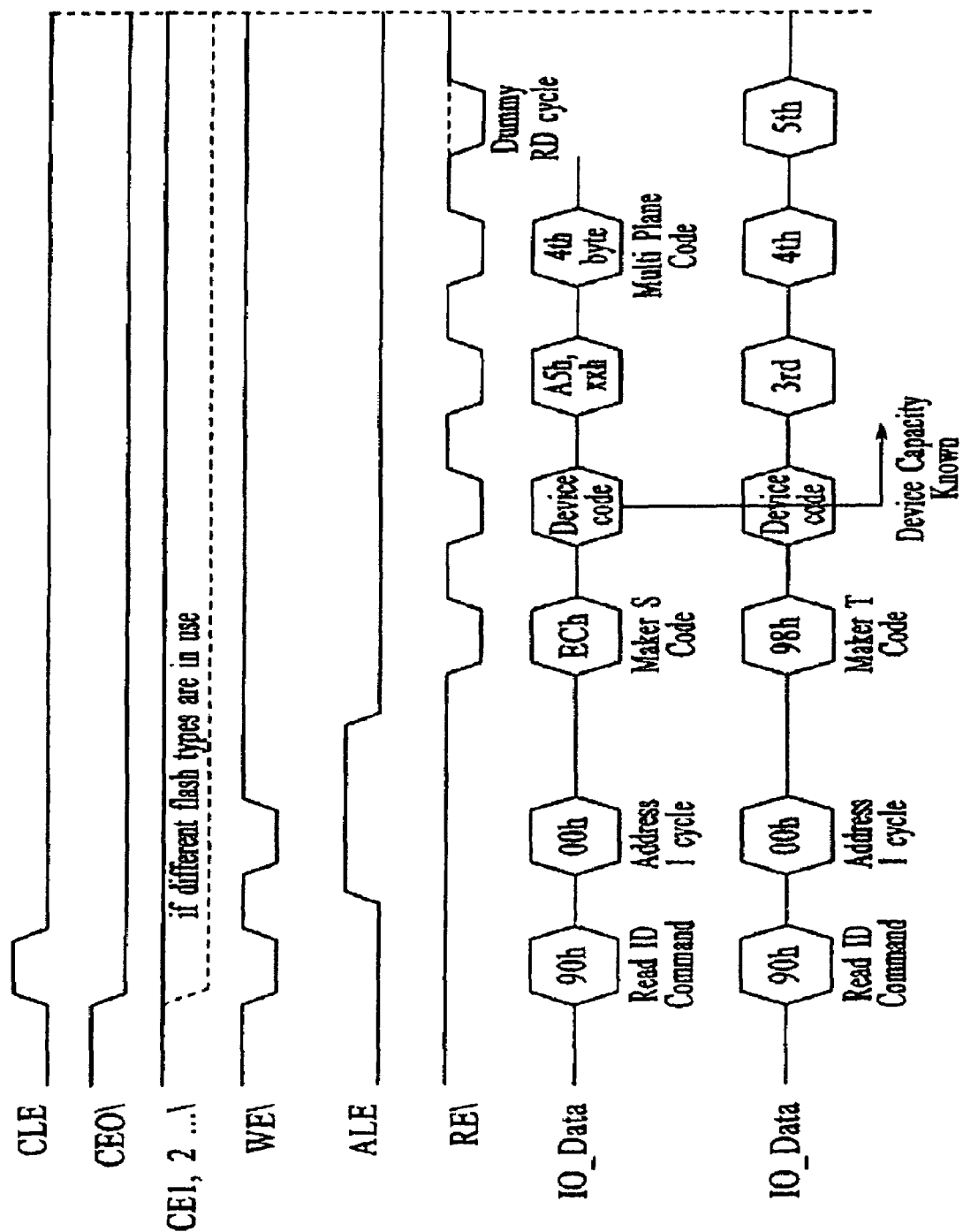
FIG. 13 is a timing diagram for a flash memory system during Read ID command execution in accordance with one embodiment of the present invention.

FIG. 13 is a timing diagram for a flash memory system in accordance with one embodiment of the present invention. In a first phase, a read ID command ("90h") is issued. In a second phase, an address (e.g. "00h") is determined. In a third phase, the maker code (e.g. "ECh" or "98h") is read. In a fourth phase, the device code is read. From a fifth phase on, other types of data are read. This data includes a page size, a block size, and a spare size, etc.

Figure 13A:
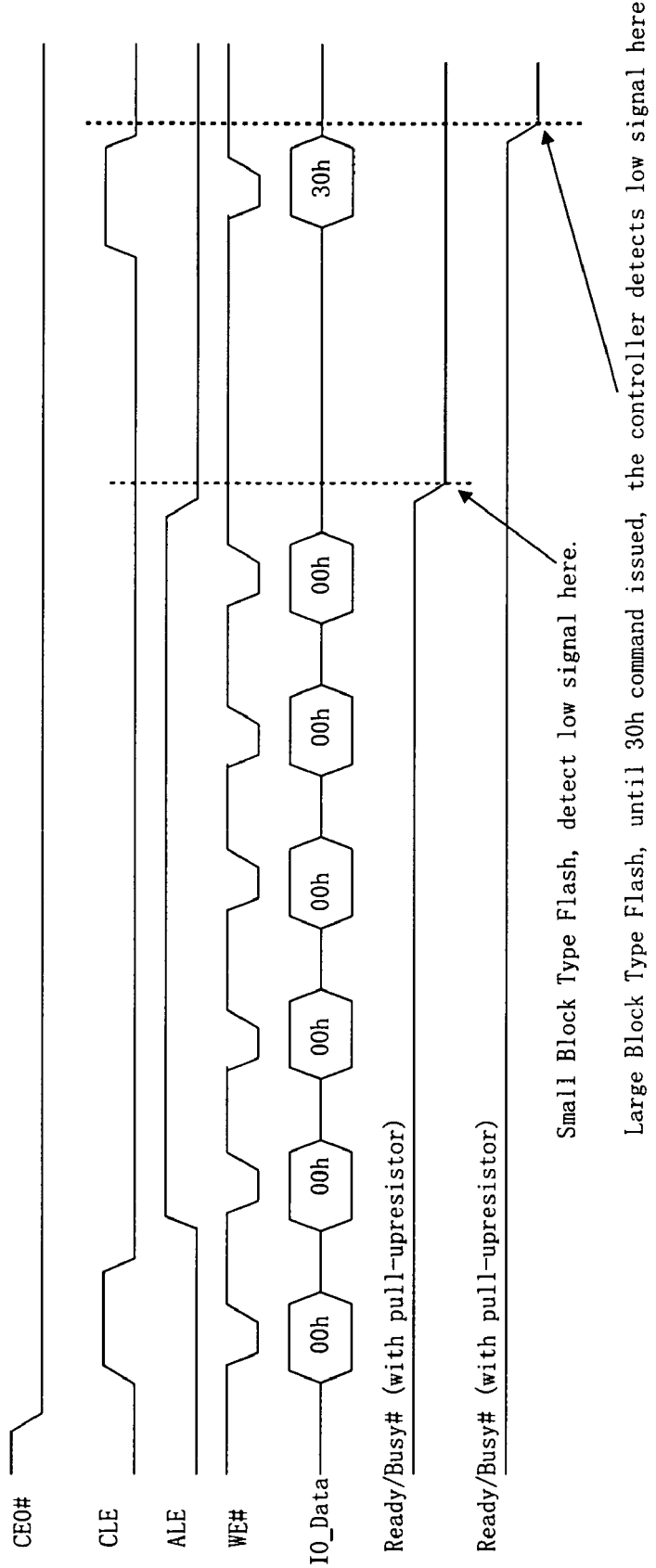
FIG. 13A is a timing diagram for a flash memory system during Read ID command execution in accordance with another embodiment of the present invention.

FIG. 13A is a timing diagram for a flash memory system in accordance with one embodiment of the present invention. Previous described boot code in a controller recognizes flash chips by Reading flash ID, then sends a corresponding read/write command to load code from flash to the Main Memory (RAM) 352. The boot code with flash ID table in a controller is implemented by ROM (or other circuit structure with the same function). This means a controller can only support all flash chips with known ID. However, new flash product with new ID cannot be recognized if a controller's boot sequence is based on an ID number. FIG. 13A provides an enhanced method to cover this corner cases. FLASH chips can be classified by two types according their different timings: a small block type flash and a large block type flash. A small block type flash pulls down a ready/busy# signal after a read command is received. A large block type flash does not act in this way, the large block type flash pulls down a ready/busy# signal until a confirm command received (Command 0x30 in hex). Therefore, a controller can judge if the flash is a small block or a large block type based on this difference (e.g., by checking if command 0x30 is required to see the flash pulls down ready/busy#). Once a controller recognizes a flash is a small or large block type, it can read data from a flash correctly, thus it can load Boot Code 206, Controller code 208 or Controller code 208A2 without any problems.

Figure 14:
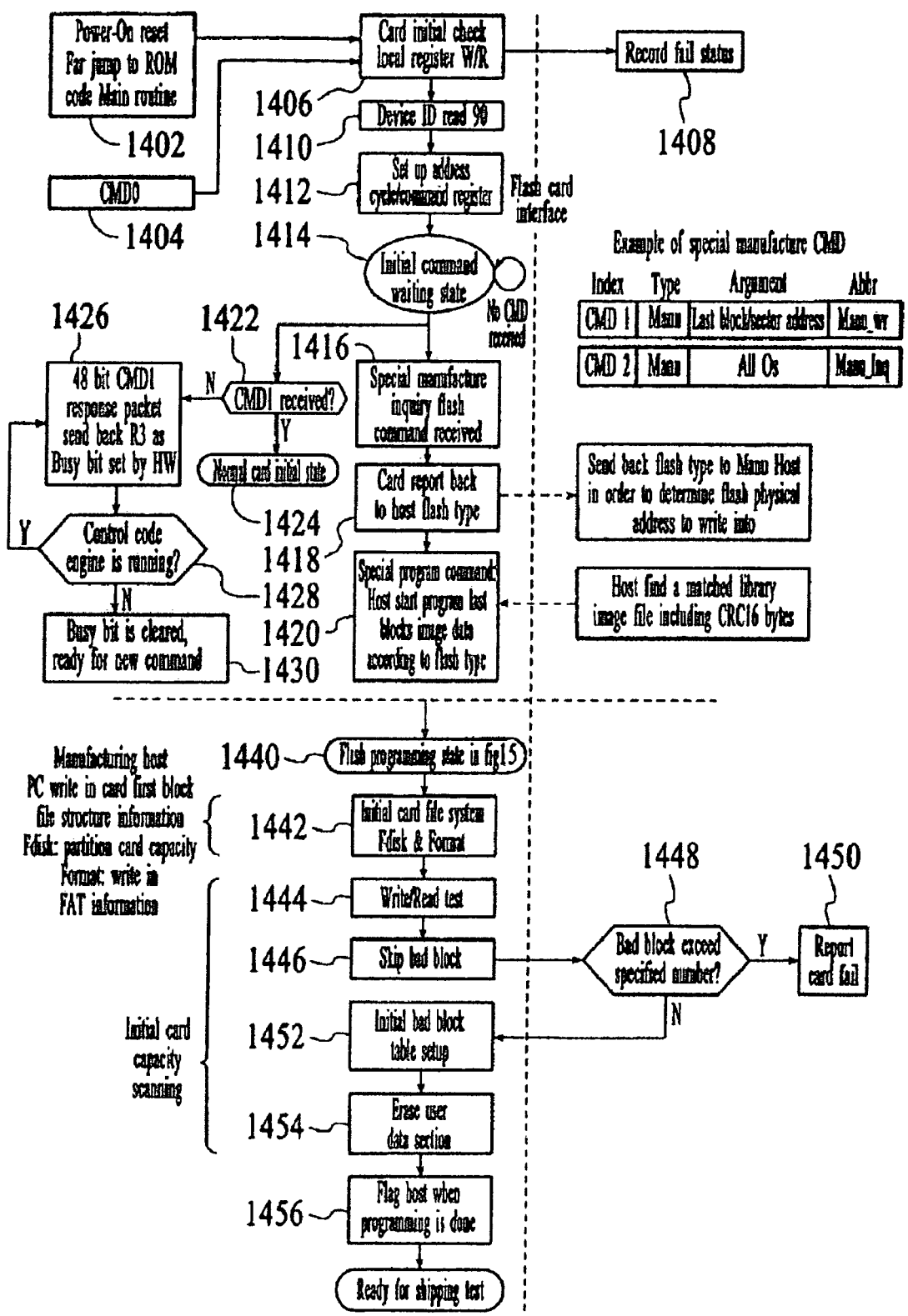
FIG. 14 is a flow chart showing a method for programming a flash card using a manufacturer host in accordance with one embodiment of the present invention.

FIG. 14 is a flow chart showing a method for programming a flash card using a manufacturer host in accordance with one embodiment of the present invention. An interrupt service routine is executed when a power-on reset is detected in the flash memory system (or flash card), in a step 1402. The power-on reset is detected when the flash memory system is connected to the manufacturer host or when host power is turned on after a flash memory system has been connected to a host system. A voltage sensor in the flash memory system checks the incoming power voltage as it increases to an operating voltage. A global reset synchronizes all state machines in the flash memory system and initializes all flash memory controller local registers to default values. The reset signal is removed when the PLL is stabilized.

A first command ("CMD0") from the manufacturer host is issued, in a step 1404, to initialize all of the state machines in the flash memory system.

Next, local registers are checked to ensure that they function properly, in a state 1406. If the local registers fail the check, they are rejected and failures are recorded, in a step 1408. Next, the flash memory device ID is read, in a step 1410. ROM code instructs the CPU to send the flash commands to an input/output interface circuit for this purpose. Next, local control registers will be loaded for correct operation, in a step 1412. This is performed while reading parameters of the flash memory device. The parameters include address phase cycles and sizing registers, which may be different for different types of flash memory devices. Step 1410 and step 1412 can be enhanced by flash type recognition in FIG. 13A if a flash ID can be found in the current ID list in the controller.

After completion of steps 1410 and 1412, the flash memory system goes into a command waiting state, remaining responsive to further instructions, in a step 1414. Such instructions can include a special manufacturer host inquiry or a command. The manufacturer host uses a special command to initiate the programming. If a special manufacturer inquiry is received, in a step 1416, the flash memory system returns the flash memory device type to the manufacturer host, in a step 1418. The flash memory type is typically provided in 4 bytes. The manufacturer host uses this information to determine the physical address of system data for the flash memory device, and writes this information to a library image file. Next, a manufacturer host sends the information file to the flash memory system, in a step 1420. The information is associated with the specific type of flash memory device and includes a library image file, card non-volatile registers, bad block maps, and operation registers. The operation registers include boot and control code starting addresses, flip pointers, and the capacity of the flash memory device.

If a normal command ("CMD1") is received, in a step 1422, the flash card goes into a normal operating mode, in a step 1424. If not, a pre-hardcode VDD voltage profile is sent back, in a step 1426. The last bit, which is a busy bit, is set. The last bit indicates that the flash memory system is either "busy" (set) or is "not ready" (cleared). Next, it is determined whether the control code engine is running, in a step 1428. Next, the busy bit is cleared, in a step 1430, unless the control code engine is running.

After the step 1420, the flash card goes into programming mode, in a step 1440. The following steps are directed to programming the flash memory device. First, a primary partition is created, and the flash memory device is formatted with file structure information, in a step 1442. The file structure information can include a master block record (MBR), a partition block record (PBR), and an initial root directory and FAT16 information. The specific file structure information required will depend on the type of an operation system of the host (e.g., Windows, Linux or Mac OS).

Next, a write/read test is performed, in a step 1444. During this test, bad blocks are identified and handled accordingly, in a step 1446. Next, it is determined whether the number of bad blocks exceeds a specified number, in a step 1448. If so, a failure report is generated, in a step 1450. If not, a bad block map is established, in a step 1452. Bad blocks are recorded in the bad block map. Next, the user data section is erased, in a step 1454. The sections storing system data and non-volatile registers are not erased. Next, the manufacturer host is flagged when the programming is completed, in a step 1456.

Figure 15:
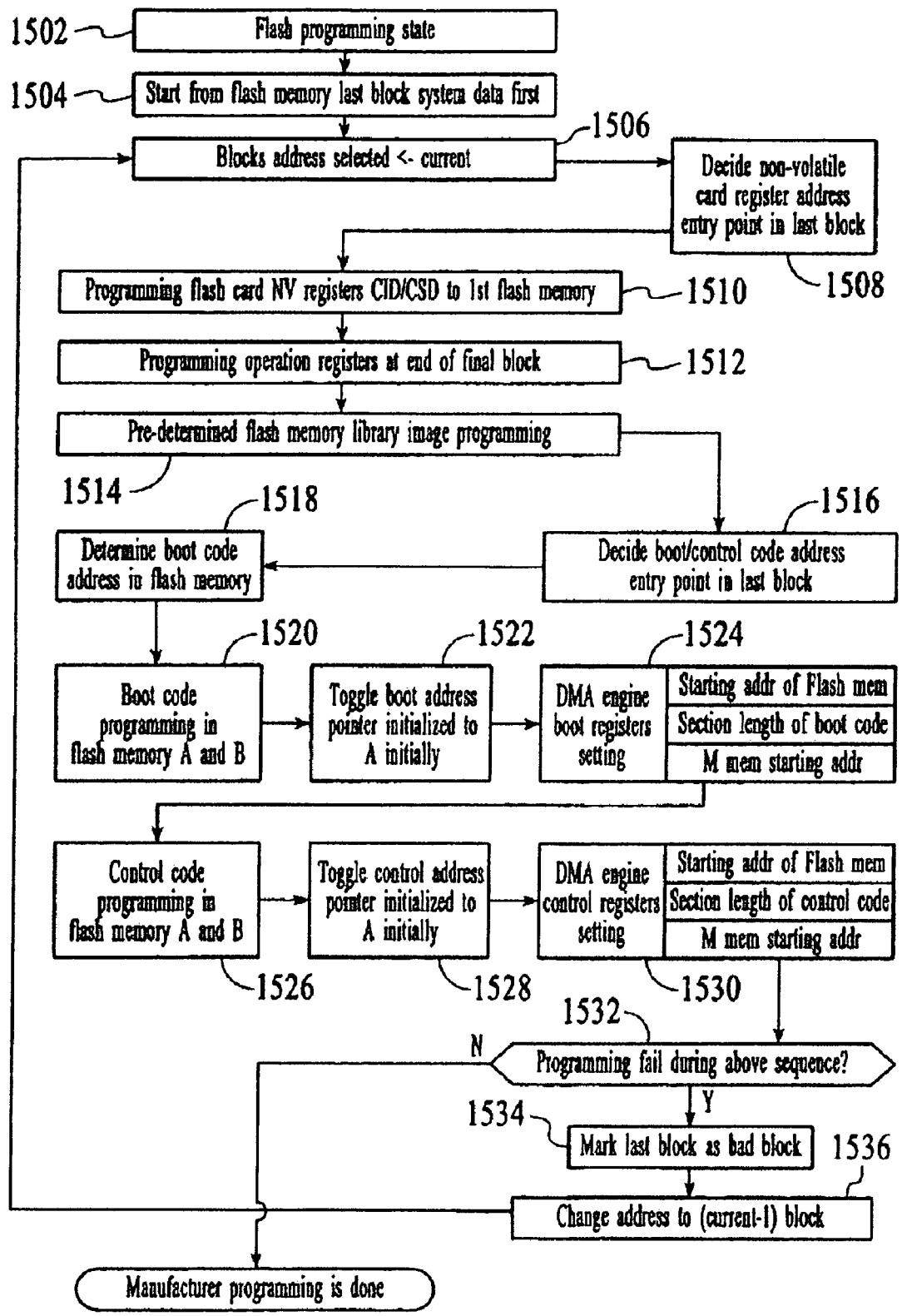
FIG. 15 is a flow chart showing a method for programming a flash card using a flash memory programmer in accordance with one embodiment of the present invention.

FIG. 15 is a flow chart showing a method for programming a flash card using a flash memory programmer in accordance with the present invention. In this specific embodiment, the flash programmer is a Jedec flash memory programmer instead of a manufacturer programmer. A Jedec flash programmer directly programs the flash memory device. Each flash memory device has a unique coding sequence, which is handled by the Jedec flash programmer.

First, an interrupt service routine is executed, in a step 1502. The interrupt service routine is the same as steps 1402-1420 of FIG. 14. Next, the last available block of the flash memory is programmed, in a step 1504. The capacity of the flash memory device is known before programming. Next, a block address is selected, in a step 1506. Next, an address is determined for a non-volatile (NV) card register address, in a step 1508. Next, NV registers are programmed, in a step 1510. These registers include a card ID (CID) register and a card specific data (CSD) register. The card ID (CID) register includes several sections of an ID, a manufacturer ID (MID), an original equipment manufacturer ID (OEM ID, or OID), a product name (PNM), a product revision (PRV), and a serial number, data, CRC7 values for checksum use. The CSD register provides information on how to access the card contents. All of the initial default values are stored in three flash memory pages. Read-only data are in one page. The user write-once field is on a different page, such that second programming cannot access this page, an example is card file format or one-time-programming (OTP).

Next, an operation condition register (OCR) is programmed, in a step 1512. The OCR contains a card voltage window that the host must know in order to work properly. For example, if the host only supports 3.3V and the card OCR informs the host that the flash card is a 5V device, the card should not operate in the system.

Programming of the OCR register is achieved by using CMD27 command, the address of OCR register which is part of the flash memory physical address is known by firmware, but not accessible to end users.

A relative card address (RCA) register and a driver stage register (DSR) is programmed with default values, which can be later modified. For easier flash programming, a logical one (or "1") in a flash memory cell is defined as a default value. For example, "1" is busy if the initial card powers up. It is "0" if not busy or the card is finished with the power up sequence.

Next, a predetermined flash memory library image file is programmed, in a step 1514. A library image file stores parameters for the flash memory and is organized, for easy access, as one page. The flash memory interface circuit uses the library image file for command decoding and access timing.

Next, address entry points are determined for boot code and control codes, in a step 1516. Next, the address for the boot code is determined, in a step 1518. Next, the boot code is programmed in the flash memory, in a step 1520. Two copies of the boot code are stored. Next, a toggle boot code address pointer is initialized, in a step 1522. Next, a DMA engine and boot registers are set, in a step 1524. The DMA engine is used during a normal code relocation process. Three units are defined to facilitate this feature: the flash memory physical starting address register; the page length register of transfer; and the main memory starting address for boot code.

Next, the control code is programmed in the flash memory, in a step 1526. At least two copies of the control code are stored. Next, a toggle control code address pointer is initialized, in a step 1528. Next, the DMA engine and control registers are set, in a step 1530. The DMA engine is used during a normal code relocation process. Three units are defined to facilitate this feature: a flash memory physical starting address register; a page length register of transfer; and a main memory starting address for control code.

Next, it is determined whether the programming fails, in a step 1532. If programming fails, the last block is marked with a bad block flag ("0"), in a step 1534. Next, the block address is decremented by one, in a step 1536, and the process starts over again from the step 1506. If in the step 1532, the programming did not fail, the manufacturer programming is done.

Figure 16:
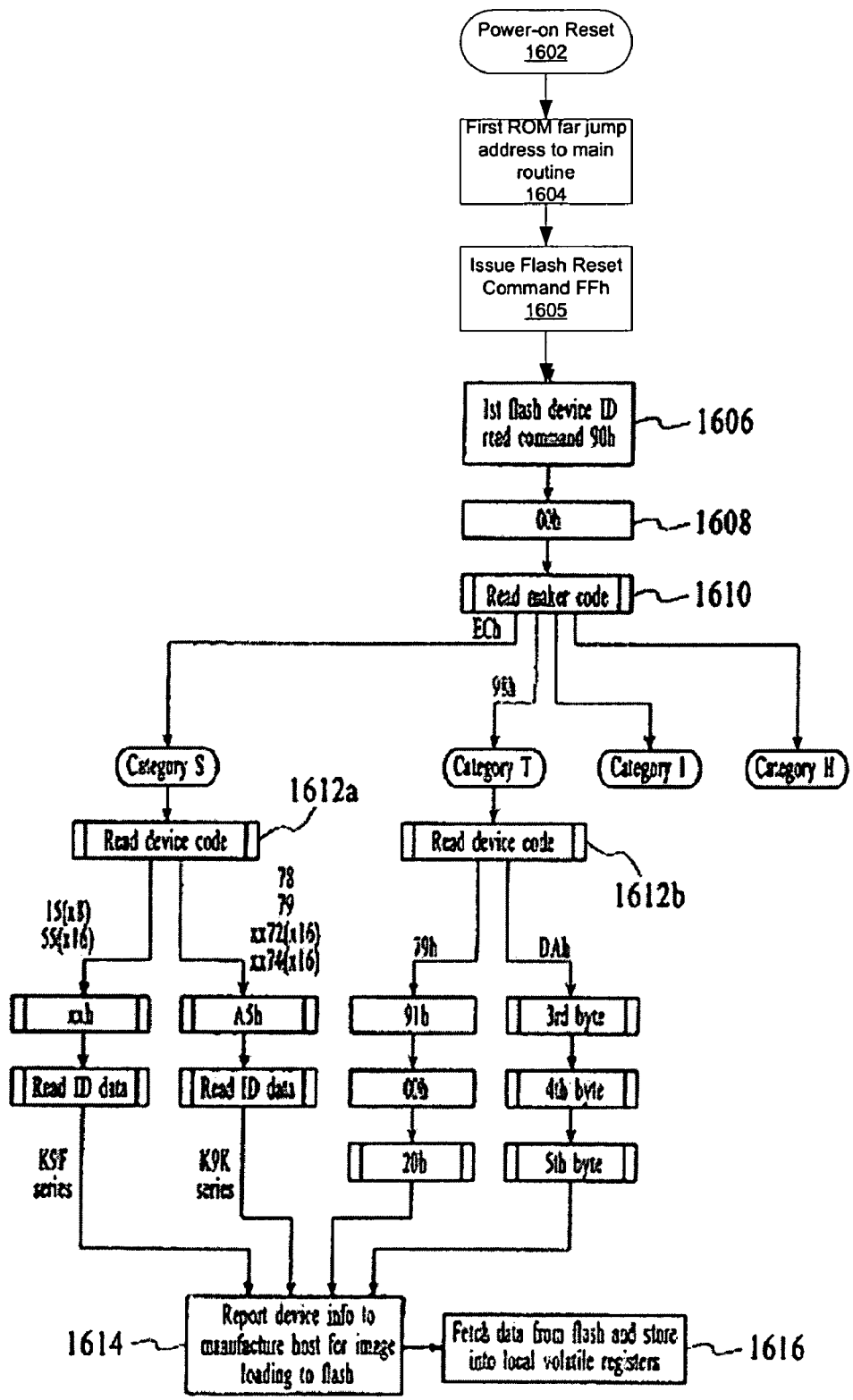
FIG. 16 is a flow chart showing a method for booting a flash card in accordance with one embodiment of the present invention.

FIG. 16 is a flow chart showing a method for booting a flash card in accordance with the present invention. First, the power-on reset is executed, in a step 1602. This occurs when the flash card is connected to a manufacturer host. Next, the reset to card CPU causes an issued resetting address to jump to a main routine of ROM code, in a step 1604. Next, the controller resets the flash by issuing a "FFh" command. Then a device ID is read, in a step 1606. This step is initiated by a "90h" command. Next, a "00h" address phase is initiated, in a step 1608. Next, a maker code is returned by the flash memory device if the CE# is active, in a step 1610. Then, various flow chart branches can be followed, depending on the returned maker code.

Next, a device code is read, in a step 1612*a* or 1612*b*, depending on the maker code (e.g., maker S or maker T). After all of the device code information is read, it is sent to the manufacturer host to select the correct library image file for the flash memory device, in a step 1614. Next, the manufacturer host writes local volatile registers with data from the flash memory device, in a step 1616. The manufacturer host also writes the correct library image file to the final block of the flash memory device.

The ROM sets up operating registers. Once the registers are set, an input/output interface circuit can work properly to facilitate the manufacturer host in downloading the library image file to the flash memory device. A short ROM code is desired to facilitate the flash card controller in recognizing the flash memory device.

Figure 17:
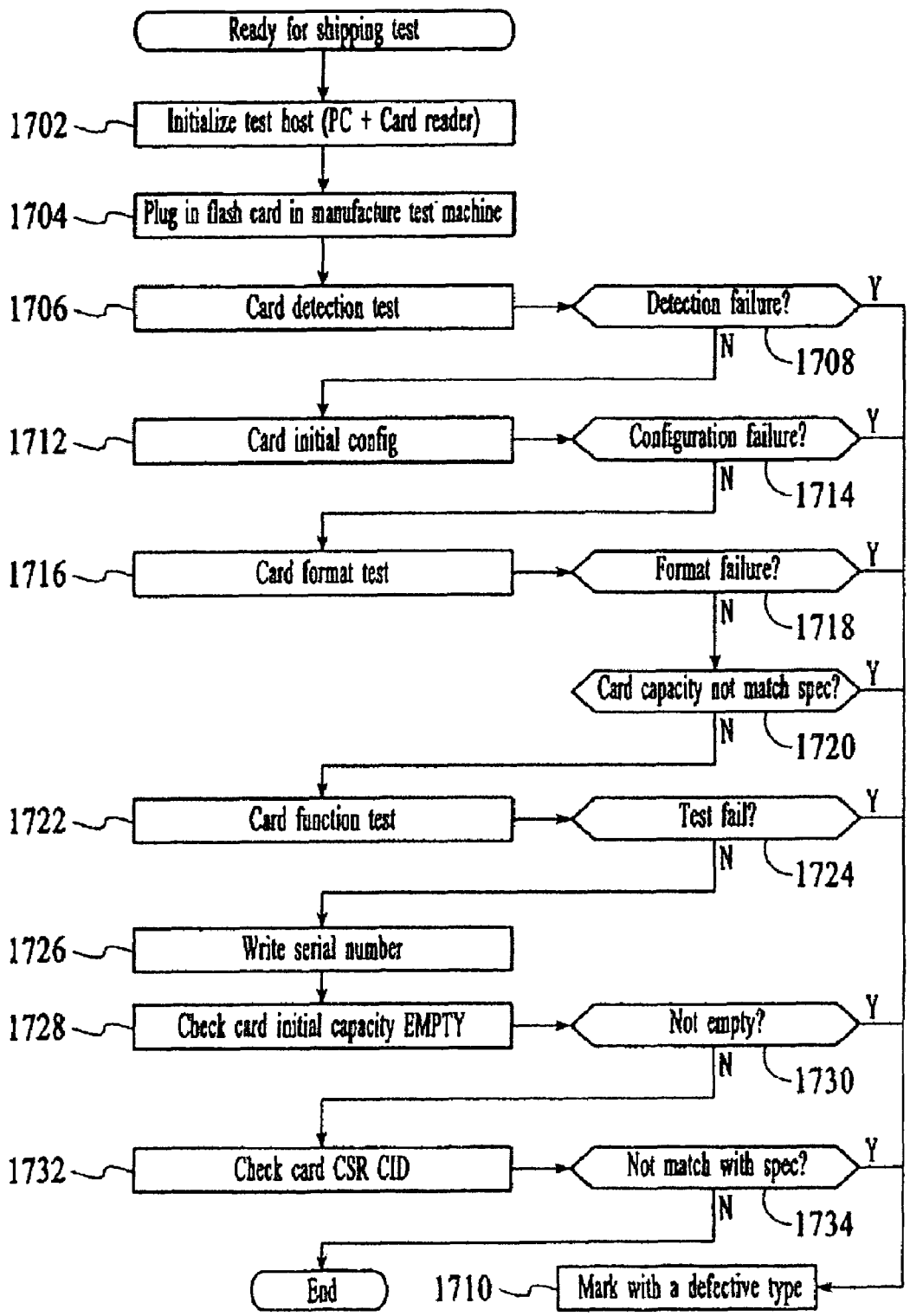
FIG. 17 is a flow chart showing a method for testing a flash card before shipping in accordance with one embodiment of the present invention.

FIG. 17 is a flow chart showing a method for testing a flash card before shipping in accordance with one embodiment of the present invention. First, the manufacturer host is initialized, in a step 1702. The manufacturer host functions as a tester host. The manufacturer host can be a PC with a card reader and/or a USB or PCMCIA interface. Next, the flash card is connected into the manufacturer host, in a step 1704. For a volume production, multiple flash cards can be plugged into the tester host to increase the testing efficiency. Next, a card detection test is executed, in a step 1706. Next, if a failure is detected, in a step 1708, the flash card is marked as defective, in a step 1710. If no failure is detected, the flash card is configured, in a step 1712. The flash card undergoes a low-level format. Next, if a configuration failure is detected, in a step 1714, the flash card is marked as defective, in the step 1710. If no failure is detected, a flash card format test is executed, in a step 1716.

The flash card is formatted to a specified file system. For example, Windows 98 requires a FAT16 system for a total file storage capacity under 128 M bytes, because a 64K cluster entry covers an entire FAT16 addressing range if the sector size is 512 bytes long. Window 2000 requires a FAT32 system for larger storage capacity. To guarantee a file read capability, FAT16 is assumed as a default file system for backward compatibility. The test program creates a partition table and then executes the formatting. Next, if a format failure is detected, in a step 1718, the flash card is marked as defective, in the step 1710. Next, it is determined if the flash card capacity matches the capacity of the specification, in a step 1720. If not, the flash card is marked as defective, in the step 1710. If the flash card capacity matches that of the specification, a card function test is executed, in a step 1722.

Next, if a failure is detected, in a step 1724, the flash card is marked as defective, in the step 1710. If no failure is detected, a serial number is written to the flash card, in a step 1726. Next, the initial flash card capacity is checked, in a step 1728. The flash card capacity needs to be emptied and made available for user before shipping. Accordingly, an erase-whole-card action is performed to reset all user accessible cells/bits to "1"s, except for the necessary tables, registers, etc.

Next, if the flash card is determined not empty, in a step 1730, the flash card is marked as defective, in the step 1710. If the flash card is empty, the control and status register (CSR), the CID, and the OCR of the flash card is checked, in a step 1732.

Next, if it is determined that the CSR and the CID do not match those of the specification, in a step 1734, the flash card is marked as defective, in the step 1710. If there is a match, then the testing sequence is complete. The flash card is tested as a good flash card.

Figure 18:
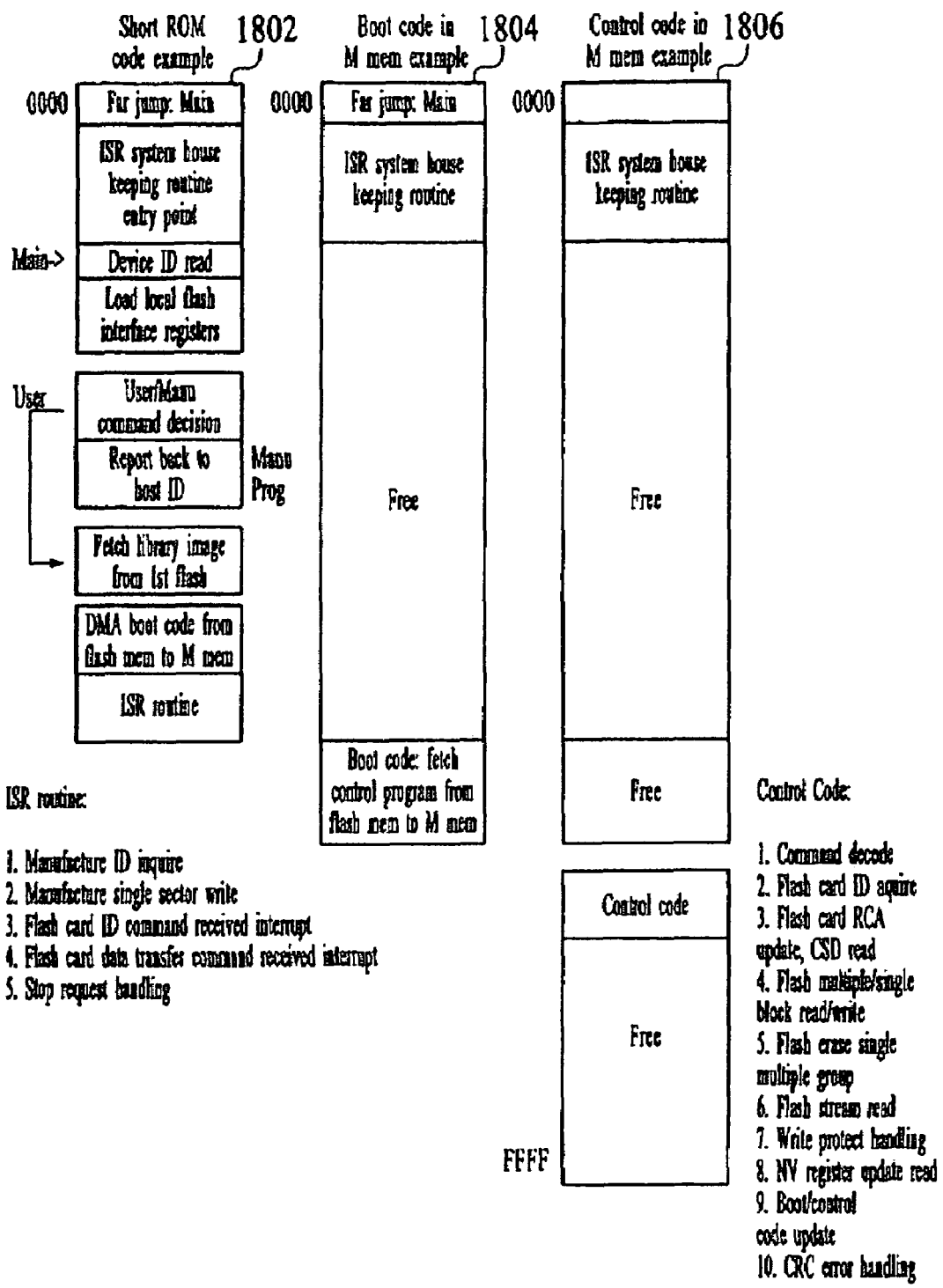
FIG. 18 is a diagram of flash memory structures in accordance with one embodiment of the present invention.

FIG. 18 is a block diagram of memory structures in accordance with one embodiment of the present invention. The software structures include short ROM code 1802, boot code 1804, and control code 1806. One of two modes is selected when the flash card is turned on. One mode is a programming mode, where flash memory device can be programmed as described above. The other mode is a normal mode, where the flash card undergoes a normal user power-on sequence.

The type of mode is determined by a command received by the flash card. A manufacturer host would issue a command putting the flash card in programming mode. While in the programming mode, the flash memory image file can be downloaded into the flash memory of the flash card. A user host (e.g., digital camera) would issue a command putting the flash card in the normal mode, and the flash card undergoes a normal user power-on sequence.

To minimize the amount of coding in the ROM, a simple flash sector write routine and a basic response back to the manufacturer host are supported in the ROM.

After the manufacturer host determines the type of flash memory device, an image data file is written to the predetermined final block(s) of flash memory before the flash card is shipped to the end user. Alternatively, if the manufacturer already knows the type of flash memory device, the image data file can be written directly to the flash memory without having to determine the type of flash memory device first.

During the normal mode, a power-on reset occurs when the card is first connected to a user host. After the power-on reset, the ROM code checks the flash card by performing writes and reads to all local volatile registers. The flash device ID cycle is issued to fill the local flash interface registers for flash memory fetching operations. A flash device ID is read, and parameters are stored in the local operation registers of the flash card.

The boot code is needed for DMA download to the main memory (RAM). The DMA download enables fast accesses to the flash memory device. Because the boot code and control code are stored in the flash memory device, the ROM code can be simple and short. An interrupt service routine (ISR) reserves all entry point addresses. The ISR supports both commands for programming mode and normal mode. At the end of the ROM code, control is passed to the boot code for necessary system operation.

The boot code downloads a more complex control code to the main memory from the reserved blocks of the flash memory device. Control is then passed to the control code. A boot code engine reduces the ROM size and enables the flash card to execute code faster, since the boot code and the control code are fetched from the main memory RAM.

The control code engine handles all flash card protocol commands.

Figure 19:
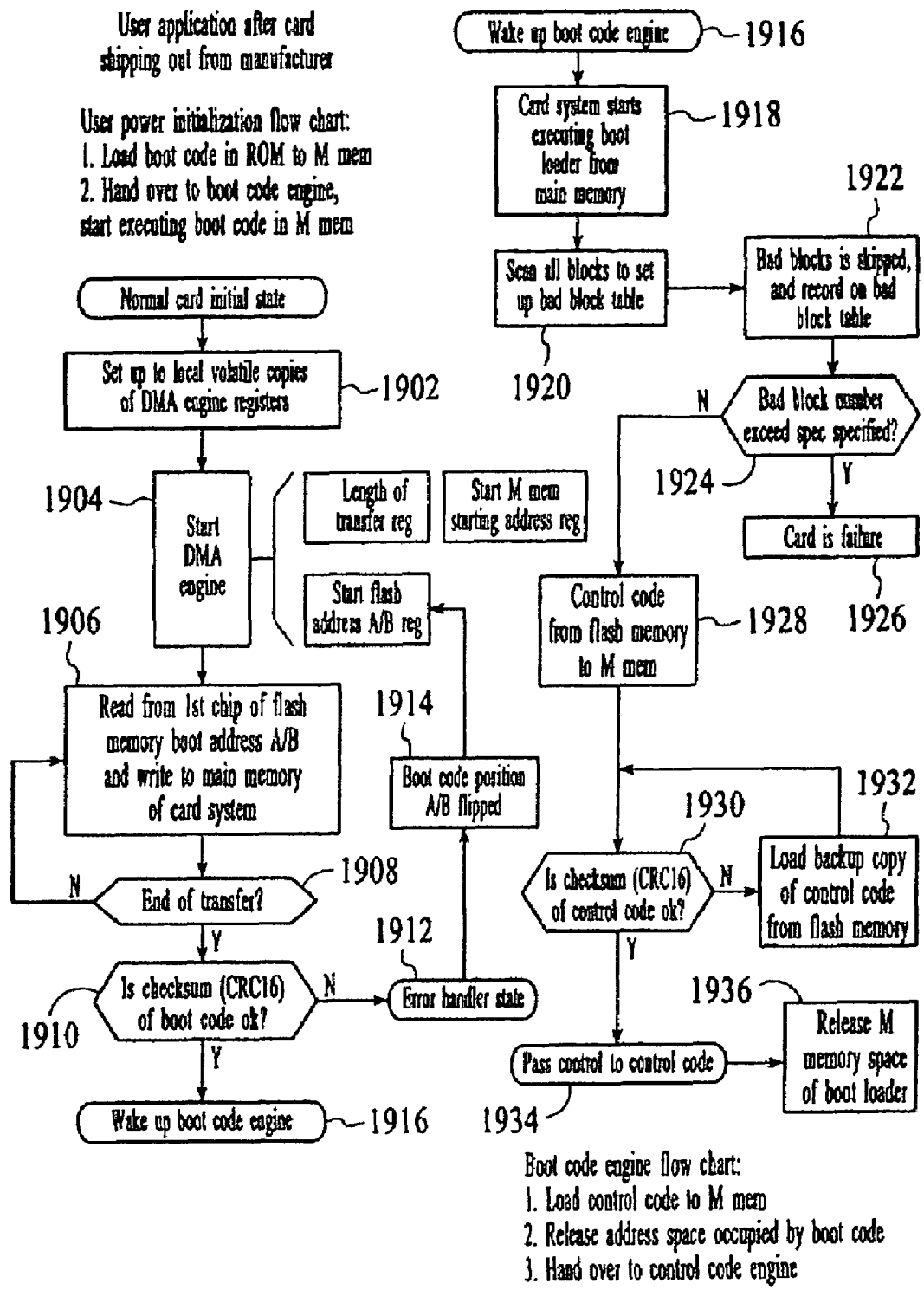
FIG. 19 is a flow chart showing a method for powering up a flash card during normal operation in accordance with one embodiment of the present invention.

FIG. 19 is a flow chart showing a method for powering up a flash card during normal operation according to one embodiment of the present invention. After being programmed by the manufacturer host, the flash card can be used by a user in a normal mode. In a flash card normal-mode initial state, the flash memory device type is already known from pre-shipping programming. The flash memory type is stored in a flash cards local flash register.

First, local volatile copies of DMA engine registers are set up, in a step 1902. Next, DMA engine is initialized, in a step 1904. As a part of the DMA engine initialization, local registers are programmed. Next, the boot code is read from the flash memory and is written to the main memory, in a step 1906. The DMA engine transfers the boot code to the main memory. As a part of the boot code read, the boot code's starting physical sector address and its sector length are read. Next, it is determined whether the transfer is complete, in a step 1908. If not, the transfer step 1906 is repeated. If the transfer is complete, the checksum (CRC16) of the boot code is checked to ensure it is correct, in a step 1910. If not, the flash card enters an error handler state, in a step 1912. Next, a flip pointer is toggled to fetch the back-up copy of the boot code in the flash memory, in a step 1914. Next, DMA process is repeated starting at the step 1904. Any errors are recorded by incrementing a counter that keeps count of the number of failures. If at step 1910, the checksum is determined to be correct, the boot code engine activated, in a step 1916.

Next, the boot code is executed from the main memory, in a step 1918. Next, all blocks are scanned for bad blocks, and a bad block map is established, in a step 1920. Upon completion of the scanning, the user data capacity is known to the flash memory system and is stored in a non-volatile register. The bad block map is located in the final block of the flash memory device, and in the first flash memory device if more than one device is used. Next, bad blocks are skipped and recorded in the bad block map, in a step 1922. Next, it is determined whether the number of bad blocks exceeds a predetermined tolerance, in a step 1924. If yes, the flash card is designated as bad and a warning is issued, in a step 1926. If not, the control code is read from the flash memory device and is written to the main memory, in a step 1928. Next, the checksum (CRC16) of the control code is checked to ensure correctness, in a step 1930. If the checksum is correct, control is passed from the boot code engine to the control code engine, in a step 1934. If not, the flow loops back and the back-up copy of the control code is loaded to the main memory, in a step 1932, the back-up copy checksum is checked for correctness, in the step 1930. After the flash memory system has booted up and the control code loaded into the main memory, the memory space occupied by the boot code is freed up for other purposes, in a step 1936. As such, execution of the control code becomes more efficient.

Figure 20:
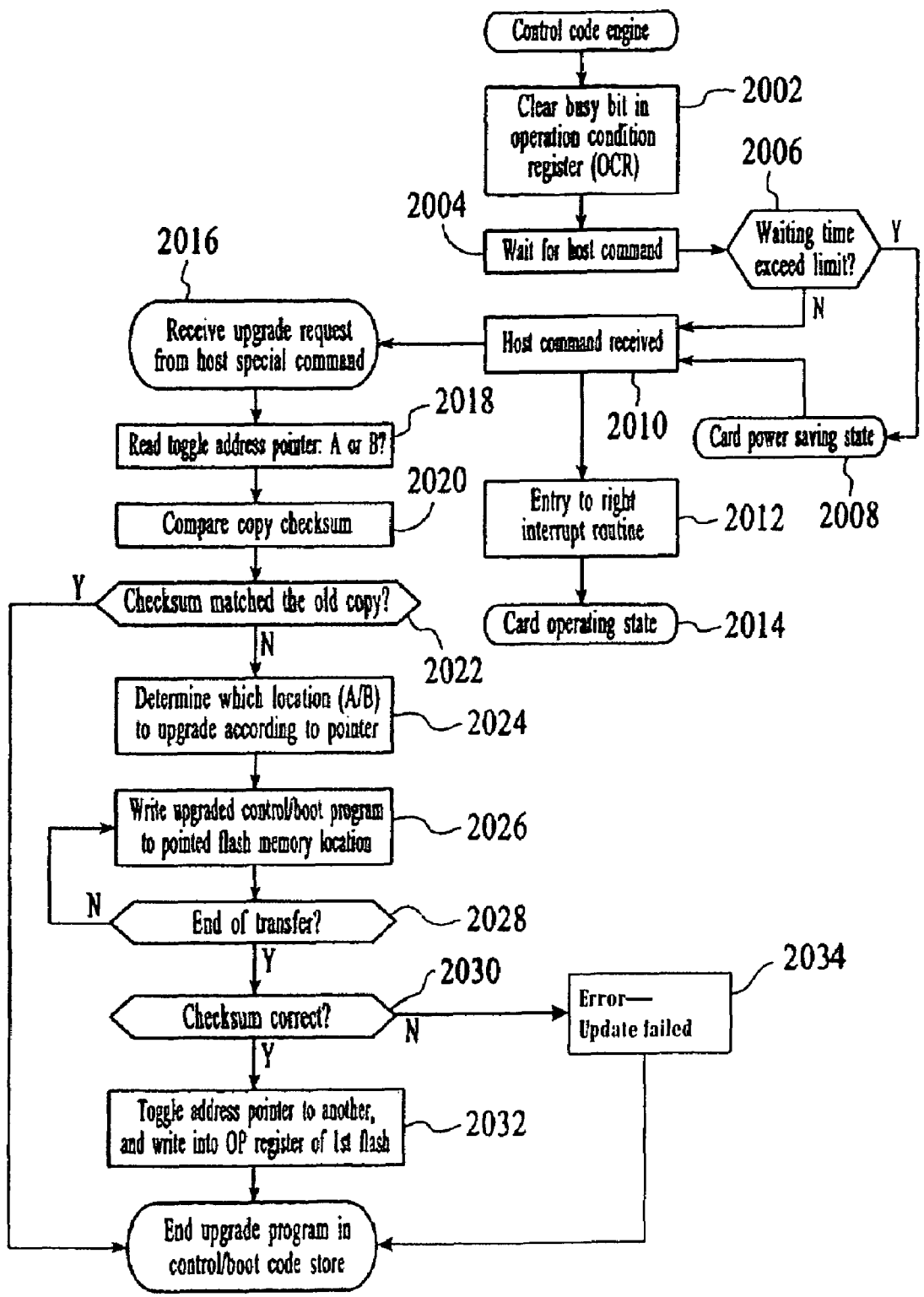
FIG. 20 is a flow chart showing a method for implementing control code during normal operation in accordance with one embodiment of the present invention.
Figure 21:
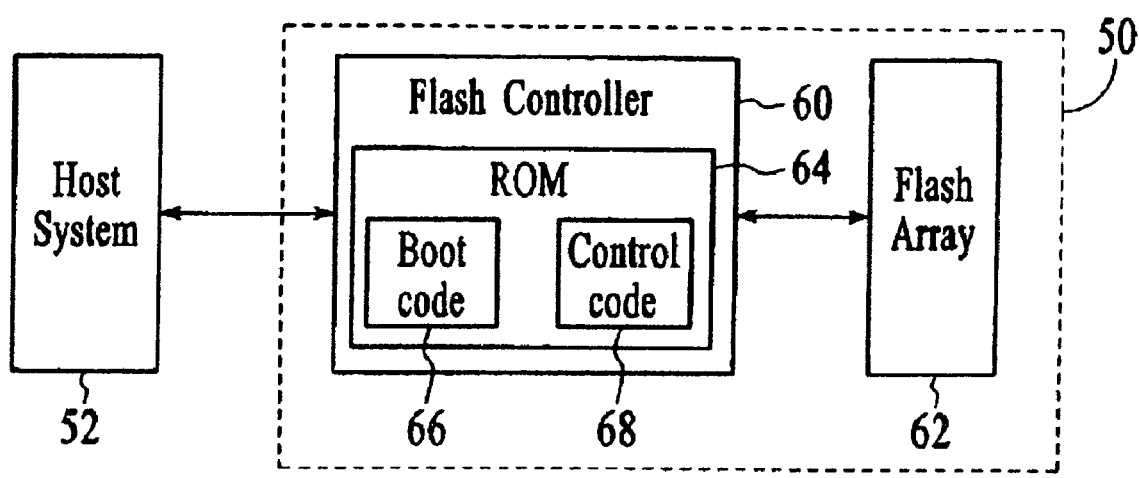
FIG. 21 is a block diagram of a conventional flash card coupled with a host system.

FIG. 20 is a flow chart showing a method for implementing control code during normal operation according to one embodiment of the present invention. Once the control code engine is initiated, a busy bit in the operation control register (OCR) is cleared, in a step 2002. Next, the control code engine is ready to accept further host commands and waits, in a step 2004. Next, it is determined whether the waiting time has exceeded a predetermined timeout limit, in a step 2006. If yes, a power saving state is initiated, in a step 2008, before receiving a new host command, in a step 2010. If no, the control code engine continues to wait until the timeout limit is exceeded or a host command is received, in the step 2010.

Any command received triggers an appropriate interrupt service routine, in a step 2012. Next, the command is decoded so that the control code engine can perform a specified task (e.g., data transferring, ID recognizing, etc.), in a step 2014. Another feature of the present invention is that a user can update the boot code or control code during field operation. This feature is valuable whenever a bug occurs or is discovered in the boot code or the control code after the flash card is shipped. As stated previously, a second back-up copy of the boot code and the control code are stored in the flash memory in case an error occurs during the update.

In the step 2010, the host command can include a special update command, in a step 2016. The source copy of the updated boot code or control code can be downloaded using a PC from various sources such as the Internet. In a specific embodiment, the updated code contains the special update command. A flip pointer points to the location of the current copy of code, in a step 2018.

Next, the checksum of the current code copy is compared to that of the source copy, in a step 2020. Next, it is determined whether the checksums match, in a step 2022. If they match, the current copy is up to date and there is no need to update it. If they don't match, the flip pointer is used to point to the back-up copy of code, in a step 2024. Next, the appropriate copy is updated, in a step 2026. Next, it is determined whether the update is completed, in a step 2028. If not, the step 2026 is repeated. If the transfer is completed, then the checksum is checked to ensure it is the correct checksum, in a step 2030. If not correct, the update process is flagged as a failure, in a step 2034, before the update attempt is ended. The flip pointer is not toggled and left ready to repeat the same update later at user's discretion. If the checksum is correct, the flip pointer is toggled and ready for next update, in a step 2032, before the update process is completed.

The control code can be big, since it handles the update process of boot and control codes. However, because the control code is stored in flash memory device instead of in the fixed ROM, it provides much flexibility and value to support in the field.

As an example, the code is checked by checksum in FIG. 19 and FIG. 20, and it is a CRC16 compatible algorithm. This is only one implement solution. Other code checking methodology is also acceptable, for instance, each 512 byte data can also be protect or checked by ECC algorithm. Once ECC error bit number is detected beyond the ability or reaching the threshold of reliability, the controller can regard it as "code error" in 1910, 1930, and 2030 steps.

Because none of the write-protect hardware has been defined in the Multi-Media Card (MMC) specification, the data stored in a card having an MMC form factor are subject to accidental removal. This can result in data loss in personal and/or business applications. The embodiment described herein enables MMC functionality in a Secure Digital (SD) form factor, while leveraging the write-protect feature that is available in SD products. The electrical-mechanical contact inside a host device (not shown) is established, and the write-protect is activated when the card is inserted and the write-protect switch in the card is set in a proper position.

SD card protocol support extra commands such as ACMD41, which the MMC protocol does not. During the power-on card ID recognizing process, a user host knows this difference by probing with an extra command and branches to different identification states without confusion.

In accordance with optional embodiments of the present invention, the interface circuit of electronic data flash card includes Universal Serial Bus (USB), Multi-Media Card (MMC), Secure Digital (SD), Memory Stick (MS), Compact Flash (CF), PCI-Express, Integrated Drive Electronics (IDE) and Serial Advanced Technology Attachment (SATA) interface circuits.

According to the system and method disclosed herein, the present invention provides numerous benefits. For example, it enables the boot and control codes to be updated in the field without having to change the flash memory controller. Also, it enables the flash memory controller to support various brands and types of flash memory devices. Also, because the boot code and control code are stored in the flash memory device instead of the ROM, the code in the ROM is minimized. As a result, the ROM can be made smaller.

A system in accordance with various embodiments of the present invention for providing a flash memory system has been disclosed. The flash memory system stores boot code and the control code in the flash memory device instead of in the ROM. As a result, the boot and control codes can be updated in the field without having to change the flash memory controller. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

We claim:

1. An electronic data flash card adapted to be accessed by a host system that is capable of establishing a communication link, said electronic data flash card comprising:
   (A) a card body;
   (B) a flash memory device mounted on the card body, the flash memory device including a plurality of non-volatile memory cells;
   (C) an input/output interface circuit mounted on the card body for establishing communication with the host system; and
   (D) a flash memory controller mounted on the card body and electrically connected to said flash memory device and said input/output interface circuit, wherein the flash memory controller is configured to determine a type of the flash memory device by
      sending a read command to the flash memory device, wherein if the flash memory device pulls down a read/busy# signal line after the read command is received, the flash memory device is associated with a small block type flash memory device, and
      sending a confirm command to the flash memory device, wherein if the flash memory device pulls down the read/busy# signal line until the confirm command is received, the flash memory device is associated with a large block type flash memory device.

2. The electronic data flash card according to claim 1, wherein the flash memory device includes a first flash memory device and a second flash memory device, and wherein the flash memory controller includes means for supporting at least one of dual-channel parallel access and interleave access to the first flash memory device and the second flash memory device.

3. The electronic data flash card according to claim 1, wherein the input/output interface circuit, an internal power regulator, and a reset circuit are integrated or partially integrated in a single multi-chip package (MCP) or in a single integrated circuits (IC) chip.

4. The electronic data flash card according to claim 1, wherein the flash memory controller comprises one of a 8051, 8052, 80286, RISC, ARM, MIPS and a digital signal processor.

5. The electronic data flash card according to claim 1, wherein the flash memory device further includes a first block for storing a pointer pointing to a second block having predetermined non-volatile memory cells.

6. The electronic data flash card according to claim 5, wherein the flash memory controller comprises means for selectively operating in one of:
   a programming mode in which said flash memory controller activates said input/output interface circuit to receive boot code data and control code data from the host system, and to store at least one of the boot code data and the control code data in the predetermined associated non-volatile memory cells of said flash memory device, which are addressed via the pointer stored in the first block;
   a reset mode in which said flash memory controller reads said at least one of the boot code data and the control code data from said associated non-volatile memory cells of said flash memory device, and enables said input/output interface circuit to exchange data with the host system in accordance with protocols based on the boot code data and the control code data; and
   a code updating mode in which at least one of updated boot code data and updated control code data are written into the flash memory device,
   wherein the first block is located within first overall predetermined physical blocks at a beginning of address ranges of the flash memory device, and wherein the second block stores at least one of the boot code data and the control code data.

7. The electronic data flash card according to claim 6, wherein the flash memory controller includes means for storing both the boot code data and the control code data in the flash memory device.

8. The electronic data flash card according to claim 6, wherein the flash memory controller includes means for storing first and second copies of the boot code data in the flash memory device.

9. The electronic data flash card according to claim 8, wherein the flash memory controller includes means for updating only the first copy of the boot code data in the flash memory device, and means for utilizing the second copy of the boot code data as a back-up copy.

10. The electronic data flash card according to claim 6, wherein the flash memory controller includes means for storing first and second copies of the control code data in the flash memory device.

11. The electronic data flash card according to claim 10, wherein the flash memory controller includes means for updating only the first copy of the control code data in the flash memory device, and means for utilizing the second copy of the control code data as a back-up copy.

12. The electronic data flash card according to claim 6, wherein the first block is a first overall physical block before a physical block storing a master boot record (MBR) of the flash memory device and wherein the second block is located at any address of the flash memory device.

13. The electronic data flash card according to claim 12, wherein the second block is located at a bottom of address ranges of the flash memory device if the first block does not function properly.

14. The electronic data flash card according to claim 6, wherein the flash memory controller further comprises a volatile main memory circuit.

15. The electronic data flash card according to claim 14, wherein the flash memory controller further comprises means for transferring said at least one of the boot code data and the control code data from the flash memory device to the volatile main memory in accordance with instructions read from a read-only-memory (ROM).

16. The electronic data flash card according to claim 15, wherein said means for transferring said at least one of the boot code data and the control code data from the flash memory device to the volatile main memory comprises utilizing direct memory access (DMA) to transfer said at least one of the boot code and the control code from the flash memory device to the main memory.

17. The electronic data flash card according to claim 15, wherein the flash memory controller further comprises means for transferring the boot code data to the main memory before transferring the control code data to the main memory, and means for freeing up the main memory space occupied by the boot code data after the control code data is transferred to the main memory.

18. The electronic data flash card according to claim 1, wherein the input/output interface circuit comprises one of a Universal Serial Bus (USB), Secure Digital (SD), Multi-Media Card (MMC), Compact Flash (CF), Memory Stick (MS), PCI-Express (PCIE), Integrated Drive Electronics (IDE), and a Serial Advanced Technology Attachment (SATA) interface circuit.

* * * * *